United States Patent
Neumeier et al.

(10) Patent No.: US 8,898,714 B2
(45) Date of Patent: *Nov. 25, 2014

(54) METHODS FOR IDENTIFYING VIDEO SEGMENTS AND DISPLAYING CONTEXTUALLY TARGETED CONTENT ON A CONNECTED TELEVISION

(71) Applicant: Cognitive Media Networks, Inc., San Francisco, CA (US)

(72) Inventors: Zeev Neumeier, Berkeley, CA (US); Edo Liberty, Or-Yehuda (IL)

(73) Assignee: Cognitive Media Networks, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,003

(22) Filed: Nov. 25, 2013

(65) Prior Publication Data

US 2014/0082663 A1    Mar. 20, 2014

Related U.S. Application Data

(63) Continuation of application No. 12/788,721, filed on May 27, 2010, now Pat. No. 8,595,781.

(51) Int. Cl.

| | | |
|---|---|---|
| *H04N 7/173* | (2011.01) | |
| *H04N 21/45* | (2011.01) | |
| *H04N 21/44* | (2011.01) | |
| *H04N 21/81* | (2011.01) | |
| *H04N 21/462* | (2011.01) | |
| *H04N 5/445* | (2011.01) | |
| *H04N 21/466* | (2011.01) | |
| *H04N 21/442* | (2011.01) | |
| *H04N 21/478* | (2011.01) | |

(52) U.S. Cl.
CPC ....... *H04N 21/8126* (2013.01); *H04N 21/4532* (2013.01); *H04N 21/44008* (2013.01); *H04N 21/462* (2013.01); *H04N 5/44591* (2013.01); *H04N 21/4667* (2013.01); *H04N 21/478* (2013.01); *H04N 21/44204* (2013.01)

USPC .......... 725/105; 725/106; 725/107; 725/108; 725/109; 725/110; 725/111; 725/112; 725/113; 725/114; 725/115; 725/116; 707/769; 707/770; 707/771; 707/772; 707/773; 707/774; 707/775; 707/776; 707/777; 707/778; 707/779; 707/780

(58) Field of Classification Search
USPC ........................................... 725/105; 707/780
See application file for complete search history.

(56) References Cited

U.S. PATENT DOCUMENTS

| | | |
|---|---|---|
| 4,677,466 A | 6/1987 | Lert, Jr. et al. |
| 4,739,398 A | 4/1988 | Thomas et al. |

(Continued)

FOREIGN PATENT DOCUMENTS

| | | |
|---|---|---|
| WO | 0144992 A1 | 6/2001 |
| WO | 2009131861 A2 | 10/2009 |

OTHER PUBLICATIONS

Anil K. Jain, Image Coding Via a Nearest Neighbors Image Model, IEEE Transactions on Communications, vol. Com-23, No. 3, Mar. 1975, pp. 318-331.

(Continued)

*Primary Examiner* — Mushfikh Alam
(74) *Attorney, Agent, or Firm* — Ostrager Chong Flaherty & Broitman P.C.

(57) ABSTRACT

Systems and methods for identifying which video segment is being displayed on a screen of a television system. The video segment is identified by deriving data from the television signals, the derived data being indicative of the video segment being displayed on the screen. This feature can be used to extract a viewer's reaction (such as changing the channel) to a specific video segment (such as an advertisement) and reporting the extracted information as metrics. The systems and methods may further provide contextually targeted content to the television system. The contextual targeting is based on not only identification of the video segment being displayed, but also a determination concerning the playing time or offset time of the particular portion of the video segment being currently displayed.

29 Claims, 11 Drawing Sheets

(56) References Cited

U.S. PATENT DOCUMENTS

| | | | |
|---|---|---|---|
| 5,019,899 A | 5/1991 | Boles et al. | |
| 5,481,294 A | 1/1996 | Thomas et al. | |
| 5,557,334 A | 9/1996 | Legate | |
| 5,572,246 A * | 11/1996 | Ellis et al. | 725/22 |
| 6,381,362 B1 * | 4/2002 | Deshpande et al. | 382/162 |
| 6,577,346 B1 | 6/2003 | Perlman | |
| 6,628,801 B2 * | 9/2003 | Powell et al. | 382/100 |
| 6,804,659 B1 * | 10/2004 | Graham et al. | 705/14.49 |
| 6,978,470 B2 * | 12/2005 | Swix et al. | 725/32 |
| 7,051,351 B2 * | 5/2006 | Goldman et al. | 725/34 |
| 7,064,796 B2 | 6/2006 | Roy et al. | |
| 7,136,875 B2 * | 11/2006 | Anderson et al. | 1/1 |
| 7,210,157 B2 * | 4/2007 | Devara | 725/18 |
| 7,421,723 B2 | 9/2008 | Harkness et al. | |
| 7,590,998 B2 | 9/2009 | Hanley | |
| 7,623,823 B2 | 11/2009 | Zito et al. | |
| 7,933,451 B2 | 4/2011 | Kloer | |
| 2001/0039658 A1 | 11/2001 | Walton | |
| 2002/0059633 A1 | 5/2002 | Harkness et al. | |
| 2002/0162117 A1 | 10/2002 | Pearson et al. | |
| 2002/0162118 A1 | 10/2002 | Levy et al. | |
| 2003/0121046 A1 * | 6/2003 | Roy et al. | 725/90 |
| 2003/0188321 A1 * | 10/2003 | Shoff et al. | 725/135 |
| 2004/0059708 A1 | 3/2004 | Dean et al. | |
| 2004/0216171 A1 * | 10/2004 | Barone et al. | 725/135 |
| 2004/0221237 A1 * | 11/2004 | Foote et al. | 715/700 |
| 2004/0240562 A1 | 12/2004 | Bargeron et al. | |
| 2005/0015796 A1 * | 1/2005 | Bruckner et al. | 725/32 |
| 2005/0235318 A1 | 10/2005 | Grauch et al. | |
| 2006/0153296 A1 | 7/2006 | Deng et al. | |
| 2006/0195860 A1 * | 8/2006 | Eldering et al. | 725/19 |
| 2006/0253330 A1 | 11/2006 | Maggio et al. | |
| 2007/0061724 A1 | 3/2007 | Slothouber et al. | |
| 2007/0109449 A1 | 5/2007 | Cheung | |
| 2007/0143796 A1 | 6/2007 | Malik | |
| 2007/0180459 A1 | 8/2007 | Smithpeters et al. | |
| 2007/0250901 A1 * | 10/2007 | McIntire et al. | 725/146 |
| 2007/0271300 A1 | 11/2007 | Ramaswamy | |
| 2007/0300280 A1 | 12/2007 | Turner et al. | |
| 2008/0046945 A1 | 2/2008 | Hanley | |
| 2008/0155588 A1 | 6/2008 | Roberts et al. | |
| 2008/0155627 A1 | 6/2008 | O'Conner et al. | |
| 2008/0208891 A1 | 8/2008 | Wang et al. | |
| 2008/0310731 A1 | 12/2008 | Stojancic et al. | |
| 2009/0052784 A1 | 2/2009 | Covell et al. | |
| 2009/0100361 A1 | 4/2009 | Abello et al. | |
| 2009/0172746 A1 | 7/2009 | Aldrey et al. | |
| 2009/0235312 A1 | 9/2009 | Morad et al. | |
| 2011/0251987 A1 | 10/2011 | Buchheit | |
| 2012/0174155 A1 | 7/2012 | Mowrey et al. | |
| 2013/0297727 A1 * | 11/2013 | Levy | 709/217 |

OTHER PUBLICATIONS

Lee et al., Fast Video Search Algorithm for Large Video Database Using Adjacent Pixel Intensity Difference Quantization Histogram Feature, International Journal of Computer Science and Network Security, vol. 9, No. 9, Sep. 2009, pp. 214-220.

Li et al., A Confidence Based Recognition System for TV Commercial Extraction, Conferences in Research and Practice in Information Technology vol. 75, 2008.

International Appln. No. PCT/US2010/057153, Int'l Preliminary Report on Patentability and Written Opinion, dated Jul. 4, 2012.

International Appln. No. PCT/US2010/0571155, Int'l Preliminary Report on Patentability and Written Opinion, dated Jul. 4, 2012.

Extended European Search Report, European Patent Application No. 10844152.8, issued on Nov. 10, 2013.

* cited by examiner

METHODS FOR IDENTIFYING VIDEO SEGMENTS AND DISPLAYING CONTEXTUALLY TARGETED CONTENT ON A CONNECTED TELEVISION

RELATED PATENT APPLICATIONS

This application is a continuation of and claims the benefit of priority from U.S. patent application Ser. No. 12/788,721 filed on May 27, 2010, which application in turn claims the benefit of priority from U.S. Provisional Application No. 61/182,334 filed on May 29, 2009, and U.S. Provisional Application No. 61/290,714 filed on Dec. 29, 2009. This application is related to co-pending application Ser. No. 12/788,748, entitled "METHOD FOR DISPLAYING CONTEXTUALLY TARGETED CONTENT ON A CONNECTED TELEVISION," filed on May 27, 2010.

BACKGROUND

This invention generally relates to systems and methods for identifying video segments being displayed on a screen of a television system, and to systems and methods for providing contextually targeted content to television systems based on such video segment identification. As used herein, the term "television systems" includes, but is not limited to, televisions such as web TVs and connected TVs and equipment collocated with or incorporated in the television, such as a set-top box (STB), a DVD player or a digital video recorder (DVR). As used herein, the term "television signals" includes signals representing video and audio data which are broadcast together (with or without metadata) to provide the picture and sound components of a television program or commercial. As used herein, the term "metadata" means data about or relating to the video/audio data in television signals.

Recent advancements in fiber optic and digital transmission technology have enabled the television industry to increase channel capacity and provide some degree of interactive television service. This advancement is due in large part to the industry combining the processing power of a computer in the form of a STB and the large information-carrying capacity of cables. Such STBs have successfully been used by the television industry to provide both a greater selection of channels and some degree of interactivity.

The technology of Interactive Television (ITV) has been developed in an attempt to allow a television (TV) set to serve as a two-way information distribution mechanism. Features of an ITV accommodate a variety of marketing, entertainment, and educational capabilities such as allowing a user to order an advertised product or service, compete against contestants in a game show, and the like. Typically, the interactive functionality is controlled by an STB which executes an interactive program written for the TV broadcast. The interactive functionality is often displayed on the TV's screen and may include icons or menus to allow a user to make selections via the TV's remote control or a keyboard.

In accordance with one known technique, the interactive content can be incorporated into the broadcast stream (also referred to herein as the "channel/network feed"). In the present disclosure, the term "broadcast stream" refers to the broadcast signal (analog or digital) received by a television, regardless of the method of transmission of that signal, e.g., by antenna, satellite, cable, or any other method of analog or digital signal transmission. One known method of transparently incorporating interactive content into a broadcast stream is the insertion of triggers into the broadcast stream for a particular program. Program content in which such triggers have been inserted is sometimes referred to as enhanced program content or as an enhanced TV program or video signal. Triggers may be used to alert an STB that interactive content is available. The trigger may contain information about available content as well as the memory location of the content. A trigger may also contain user-perceptible text that is displayed on the screen, for example, at the bottom of the screen, which may prompt the user to perform some action or choose amongst a plurality of options.

Connected TVs are TVs that are connected to the Internet via the viewer's home network (wired or wireless). Interactive web-type applications run on these TVs. There are several competing connected TV platforms. Yahoo is the most prominent one (see http://connectedtv.yahoo.com/). The basic common features of such connected TV platforms are: (1) a connection to the Internet; and (2) the ability to run software on top of the TV display. Several TVs with this support are already in the market (e.g., LG, Samsung and Vizio have models out). Many more will enter the market in the near future. Industry observers expect all new TVs to have these features within a few years.

Connected TVs can run an application platform such as the Yahoo widget engine, Flash Lite (see http://www.adobe.com/products/flashlite/), Google Android, or proprietary platforms. A developer community builds widgets to run on this platform. A widget is an element of a graphical user interface that displays an information arrangement changeable by the user, such as a window or text box. A widget engine is an operating system on which widgets run. As used herein, the term "widget" refers to code that runs on a widget engine. Each widget runs its own system process, so that one widget can be shutdown without affecting other widgets. The widget engine may include a feature called a "dock", which shows a respective icon for each available widget. TV widgets allow a television viewer to interact with the television, e.g., by requesting additional information relating to the subject matter being viewed, without switching the viewer's context from watching a television program to entering an application. In response to such a request, the requested information is displayed as part of the visual representation of the widget on the television screen.

Currently virtually all TVs (connected or otherwise) do not have any metadata on what the viewer is watching. While some information is available in bits and pieces in the content distribution pipeline, by the time a show reaches the screen, all information other then video and audio has been lost. In particular, the TV does not know what channel or show the viewer is watching, nor what the show is about. (The channel and show information a person sees on his/her screen is grafted on the STB from sometimes incomplete information.) This barrier is the result of the fundamental structure of the TV content distribution industry. This is a severe issue for interactive TVs since it limits their scope to strictly pull functionality.

There is a need for improvements in systems and methods for identifying what video segment is being viewed on a television. There is also a need for improvements in systems and methods of providing contextually targeted content to a connected television system.

BRIEF SUMMARY

The present invention is directed to systems and methods for identifying which video segment is being displayed on a screen of a television system. In particular, the resulting data identifying the video segment being viewed can be used to extract a viewer's reaction (such as changing the channel) to a specific video segment (such as an advertisement) and reporting the extracted information as metrics.

In accordance with some embodiments, the video segment is identified by sampling a subset of the pixel data being displayed on the screen (or associated audio data) and then finding similar pixel (or audio) data in a content database. In accordance with other embodiments, the video segment is identified by extracting audio or image data associated with such video segment and then finding similar audio or image data in a content database. In accordance with alternative embodiments, the video segment is identified by processing the audio data associated with such video segment using known automated speech recognition techniques. In accordance with further alternative embodiments, the video segment is identified by processing metadata associated with such video segment.

The invention is further directed to systems and methods for providing contextually targeted content to an interactive television system. The contextual targeting is based on not only identification of the video segment being displayed, but also a determination concerning the playing time or offset time of the particular portion of the video segment being currently displayed. The terms "playing time" and "offset time" will be used interchangeably herein and refer to a time which is offset from a fixed point in time, such as the starting time of a particular television program or commercial.

More specifically, the invention comprises technology that can detect what is playing on a connected TV, deduce the subject matter of what is being played, and interact with the viewer accordingly. In particular, the technology disclosed herein overcomes the limited ability of interactive TVs to strictly pull functionality from a server via the Internet, thereby opening up business models such as: (1) applications that deepen viewers' engagement with shows being watched by providing additional content (director commentary, character biographies, etc.); (2) applications that provide "buy now" functionality based on specific content (product placement, "buy this song" functionality, etc.); and (3) applications that provide viewers access to web-style promotional features (games, contests, etc.).

In accordance with some embodiments, the video segment is identified and the offset time is determined by sampling a subset of the pixel data (or associated audio data) being displayed on the screen and then finding similar pixel (or audio) data in a content database. In accordance with other embodiments, the video segment is identified and the offset time is determined by extracting audio or image data associated with such video segment and then finding similar audio or image data in a content database. In accordance with alternative embodiments, the video segment is identified and the offset time is determined by processing the audio data associated with such video segment using known automated speech recognition techniques. In accordance with further alternative embodiments, the video segment is identified and the offset time is determined by processing metadata associated with such video segment.

As will be described in more detail below, the software for identifying video segments being viewed on a connected TV and, optionally, determining offset times can reside on the television system of which the connected TV is a component. In accordance with alternative embodiments, one part of the software for identifying video segments resides on the television system and another part resides on a server connected to the television system via the Internet.

Other aspects of the invention are disclosed and claimed below.

BRIEF DESCRIPTION OF THE DRAWINGS

FIG. 5 is a drawing showing an exemplary pop-up window which appears when an associated field, displayed on the widget depicted in FIG. 4, is clicked on.

Reference will hereinafter be made to the drawings in which similar elements in different drawings bear the same reference numerals.

DETAILED DESCRIPTION

Figure 1:
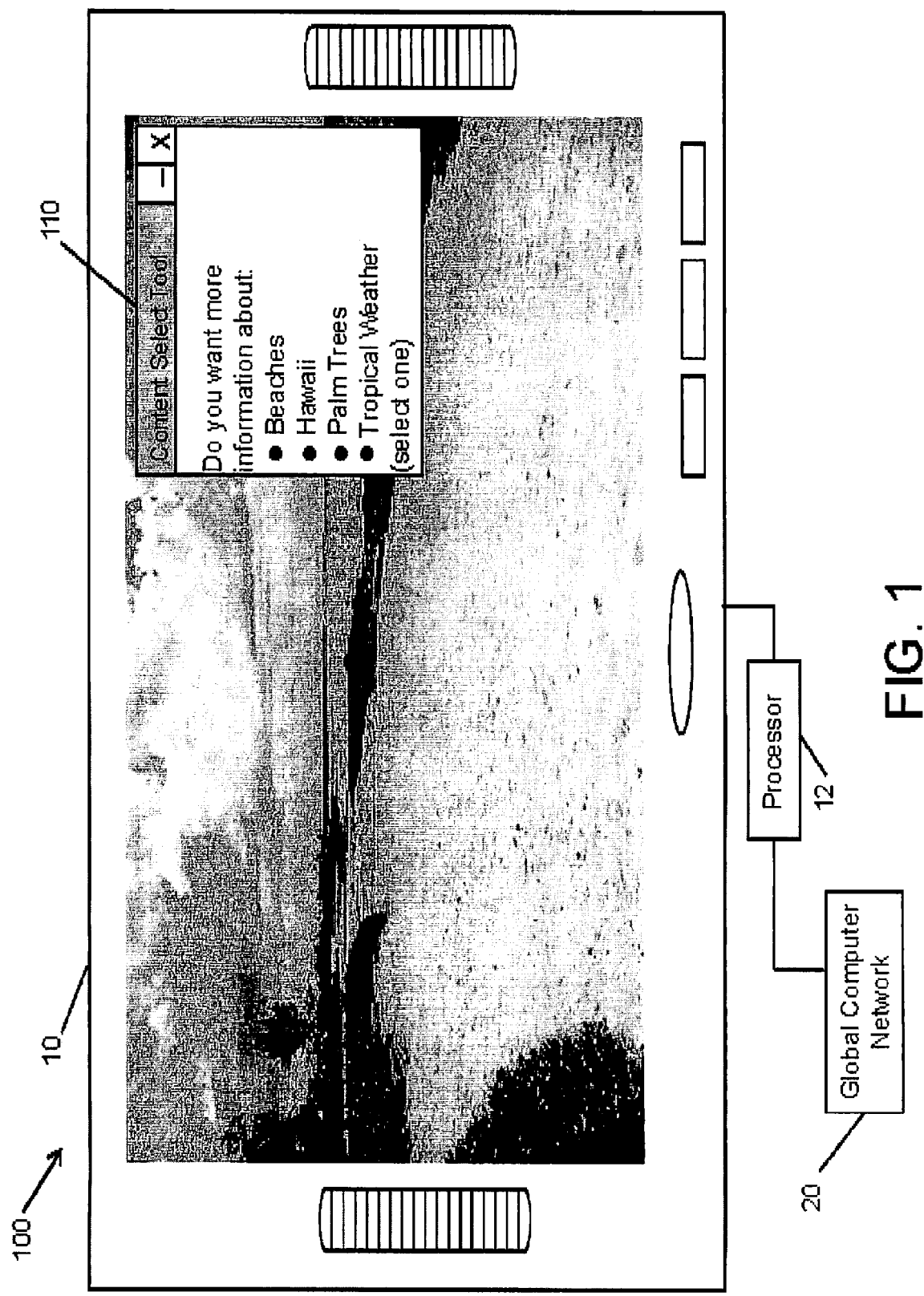
FIG. 1 is a schematic diagram of a connected television in accordance with one embodiment of the invention.

In accordance with a first embodiment of the invention shown in FIG. 1, a system 100 includes a connected television (TV) 10. The connected TV 10 is connected to a global computer network 20, typically through a processor 12. Although the processor 12 has been depicted as being external to the connected TV 10, the person skilled in the art will appreciate that the processor 12 can be located internal to the TV. As used herein, the term "global computer network" includes the Internet. Although FIG. 1 does not show a source of television signals, it should be understood that the connected TV 10 receives a television signal that carries a program stream.

A content widget, which runs on the processor 12, includes computer software for identifying in real time which video segment is being displayed on the connected TV 10. Optionally, the content widget may further include computer software for determining what is the time offset from the starting time of the segment. The segment and offset together are referred to herein as the "location". In response to identifying the video segment being viewed and, optionally, determining the time offset, the widget presents the TV viewer with a widget in the form of pop-up window 110 that shows categories relating to the subjects most relevant to the video segment being viewed. From this window 110 the viewer can select one of the subjects and, based on the viewer's selection, the widget software running on the processor 12 will retrieve more information about the selected subject from the global computer network 20. This may be done, for example, by entering the selected subject into a search engine, an on-line encyclopedia or a custom search algorithm. This may also be done by entering the location into a custom algorithm that displays pre-scripted content based on show and location.

Content detection may be done in one of several ways. In one embodiment, the widget examines metadata provided with the program stream that sets forth the main subjects being discussed in the program stream. For example, the widget examines closed captioning data sent with the television signal. In another embodiment, the widget employs speech recognition software and maintains a table that counts the number of times the detected words are used over a period of time. In yet another embodiment, the widget can employ audio signature detection or image recognition software to identify the displayed images in the program stream. In yet other embodiments the widget sends cues from the video or audio to a server where detection and contextual targeting is done (One embodiment of suitable video pixel cue processing software will be described in detail later with reference to FIG. 10.) The relevance of a subject can be determined in a number of ways.

In response to identifying the video segment being viewed and, optionally, determining the time offset, the TV widget retrieves additional information which is targeted as being relevant to the context of the subject matter of the video segment being viewed. The process of retrieving additional information or an advertisement which is targeted as being relevant to the context of the subject matter of the video segment being viewed will be referred to hereinafter as "contextual targeting." A contextual targeting TV widget will now be described with reference to FIGS. 2-5.

The contextual targeting TV widget is software that runs on top of the connected TV 10. This software extracts information sufficient to identify what the viewer is currently watching, and then, based on the extracted information, targets additional information on subjects that are likely to be of interest to the viewer. This additional information is displayed on the screen on top of the program being displayed on the TV screen. The additional information comes over the network (usually the Internet) from a feed or an Internet conglomeration tool (e.g., Wikipedia or Google). Some of this information is served to the user as free value added while some of it is paid for as advertisement or promotional deals.

To demonstrate the viewer experience provided by the systems disclosed herein, several scenarios will now be described.

Figure 2:
FIGS. 2-4 are drawings showing respective exemplary widgets which can be displayed on a connected TV in response to detection of a video segment that is related by subject matter.

In accordance with a first scenario depicted in FIG. 2, the system achieves a regular integration by picking up a keyword and targeting general information and ad words. In this first scenario, the viewer is watching a popular show such as Gossip Girl. At one juncture during viewing of that show, the characters are talking about going to the Hamptons for the summer. The contextual targeting TV widget detects the keyword "Hamptons". In response to detection of that keyword, the widget dock flashes or highlights the new keyword, as indicated by the light shading in FIG. 2. If the viewer has the widget dock open (i.e., they are interested in interacting with widgets), then the viewer can expand the widget. If not, the keyword is saved in case the viewer wants to see it later. The TV viewer can always scroll the last N keywords, where N is an integer, e.g., 50. When the viewer sees something he/she is interested in, the viewer clicks on highlighted keyword and the widget expands into a sidebar mode. The TV show continues to run in the background. The expanded widget, as seen in FIG. 2, now shows targeted information about the Hamptons, such as: (1) a short description on what the Hamptons are: "The Hamptons are a popular seaside resort. Parts of the Hamptons are a playground for the rich who own summer homes there; they also serve as a summer colony . . . "; and (2) a Google map of where the Hamptons are located. The expanded widget in this example may also show some news results about the Hamptons, such as: "Despite her rep's claim that a pesky paparazzo was to blame for Madonna's weekend fall from a horse in the Hamptons, the officers who responded to the scene . . . ". In response to the viewer clicking on other displayed fields, the expanded widget can also show targeted advertisements relating to, e.g., real estate in the Hamptons; travel to NYC; and vacation packages to other warm beach destinations where rich people congregate like they do in the Hamptons.

Figure 3:

In accordance with a second scenario depicted in FIG. 3, the system achieves a more complex integration by picking up a popular keyword and leveraging relationships with one-click retailers such as Amazon and promotional campaigns. In this second scenario, the viewer is watching a current events show such as Entertainment Tonight or the Daily Show. During the show, someone talks about something done by a public figure, for example, Britney Spears. The contextual targeting TV widget picks up the keywords "Britney Spears". In response to detection of those keywords, the widget dock flashes or highlights the new keywords, as indicated by the light shading in FIG. 3. If the viewer has the widget dock open, then the widget sidebar will show targeted information, such as: (1) a quick biography of Britney Spears: "Britney Jean Spears (born Dec. 2, 1981) is an American singer and entertainer. Spears is ranked as the eighth best-selling female recording artist in . . . "; (2) recent albums with "Buy Now" buttons: 1999: . . . Baby One More Time; 2000: Oops! . . . I Did It Again; 2001: Britney; 2003: In the Zone; 2007: Blackout; and 2008: Circus; (3) some news results about Britney Spears (taking into consideration the proximity of the earlier "Hamptons" keyword if applicable); (4) a link to images or YouTube search results for Britney Spears pictures or music videos; and (5) a promotional advertisement for Britney Spears' latest concert with an interactive calendar for shows in the viewer's geographical area and a "Buy Now" button. When the viewer clicks on a "Buy Now" button, a screen is opened to complete the transaction with as few steps as possible (e.g., using an Amazon ID/password combination). After the first time, a viewer can make a purchase without the need to re-enter his/her personal information.

Figure 4:
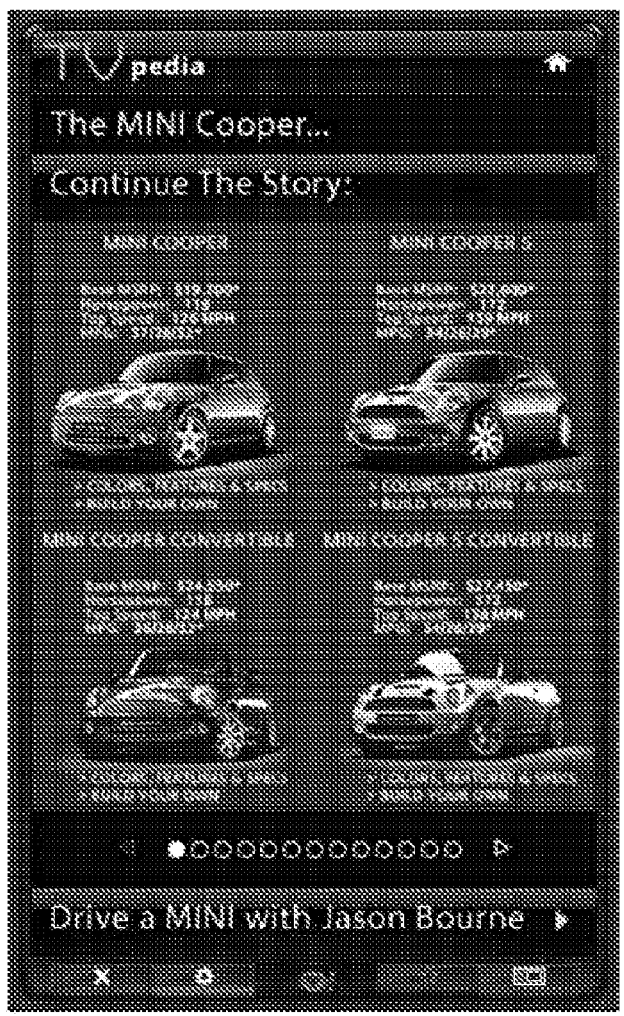
Figure 5:
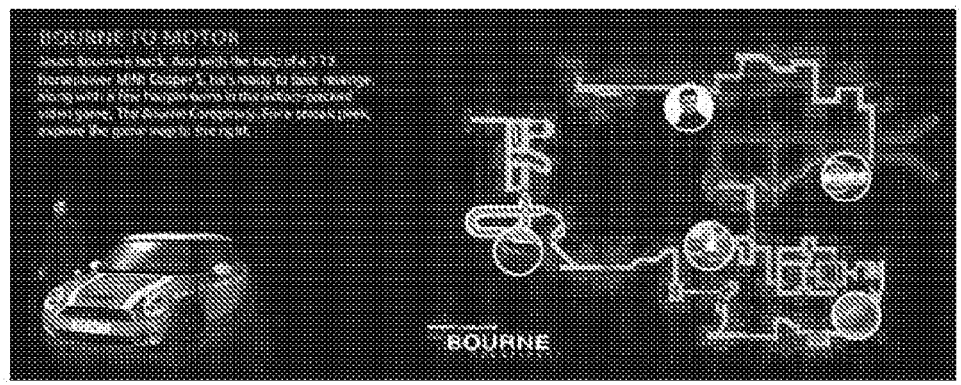

In accordance with a third scenario depicted in FIG. 4, the system achieves a customized integration by picking up keywords or specific video/audio segments purchased by specific partners for rich media promotional campaigns. In this third scenario, the viewer is watching an advertisement; for example, a car commercial. In this example, the advertisement presents the viewer with a call to action to activate their widget dock to "Continue The Story". The contextual targeting widget picks up the advertisement by a predefined marker or phrase and gives it preference over other events for a specified amount of time. The widget sidebar shows a microsite that gives the user incentives to deepen the experience with the brand, such as: additional webasodes expanding characters or themes from the advertisement; additional information such as specs or feature comparisons; and interactive features such as games, sweepstakes or customization tools. For example, in response to the viewer clicking on the field "Drive a MINI with Jason Bourne", The Bourne Conspiracy-MINI microsite (shown in FIG. 5) is displayed.

In accordance with some embodiments, the video segment is identified and the offset time is determined by sampling a subset of the pixel data being displayed on the screen (or associated audio data) and then finding similar pixel (or audio) data in a content database. In accordance with other embodiments, the video segment is identified and the offset time is determined by extracting audio or image data associated with such video segment and then finding similar audio or image data in a content database. In accordance with alternative embodiments, the video segment is identified and the offset time is determined by processing the audio data associated with such video segment using known automated speech recognition techniques. In accordance with further alternative embodiments, the video segment is identified and the offset time is determined by processing metadata associated with such video segment.

In accordance with further embodiments, the offset time need not be determined and the system simply reacts to the presence of key words or phrases. For example, in accordance with one version of software that could run on the processor 12 seen in FIG. 1, there would be four basic software modules: (1) a metadata gathering module which gathers metadata on whatever is being viewed on the TV; (2) a subject/keyword extraction module which analyzes the gathered metadata and extracts what the program "is about"; (3) a contextual targeting of useful information module which gathers and presents additional information to the user based on the extracted subject/keywords extracted above; and (4) a contextual targeting of advertisements module which gathers and presents revenue-creating information to the user based on the extracted subject/keywords extracted (this would include "buy now" buttons as well as keyword ads, and promotional campaigns).

There are many possible sources of metadata on what the viewer is watching including: (1) program information provided by the networks/stations or a third party (e.g., TV Guide); (2) closed captioning feeds; (3) an audio feed of the program being watched (run through speech recognition); (4) a video feed of the program being watched (run through image recognition); (5) additional channels riding on top of the audio or video feed of the program being watched; and (6) custom content manually attributed to specific programs and sections within a program.

In accordance with one specific embodiment, the processor 12 gathers metadata from a combination of the audio feed of the program being watched and closed captioning information when available. The audio stream will be processed by a speech recognition engine for key-phrase extraction. A Dictionary and Language Model for the speech recognition algorithm will be carefully maintained to efficiently extract only those key words or phrases deemed to be worthy of targeting. For example, the dictionary will be weighted to look for proper nouns like "Britney Spears" or "The Yankees" and will be discouraged from recognizing adjectives like "green" or "hot". In the case of closed captioning data, the stream (this time a text stream) will be processed by a key-phrase/subject analysis engine.

Four possible setups for the metadata gathering components will now be described. In the embodiment shown in FIG. 6, the data processing needed for metadata gathering and for contextual targeting are performed on a centrally located server connected to a remotely located TV via a wide area network, e.g., the Internet. In the embodiment shown in FIG. 7, the data processing needed for metadata gathering is performed on the TV, while the data processing needed for contextual targeting is performed on a centrally located server connected to a remotely located TV via a wide area network. In the embodiment shown in FIG. 8, the data processing needed for contextual targeting is performed on a centrally located server connected to a remotely located TV via a wide area network, while the data processing needed for metadata gathering is performed on an offline server that is connected to the contextual targeting server by, e.g., a local area network. Note that in this embodiment the TV client 18 sends the Channel Recognition component 26 on the server cues to determine which program is being watched and therefore which metadata is applicable to this TV. Also note that while FIG. 8 shows using the audio stream as the input to the TV client 18, a video input is applicable in the same way. Alternatively, a hybrid solution, combining the foregoing approaches, is possible.

Figure 6:
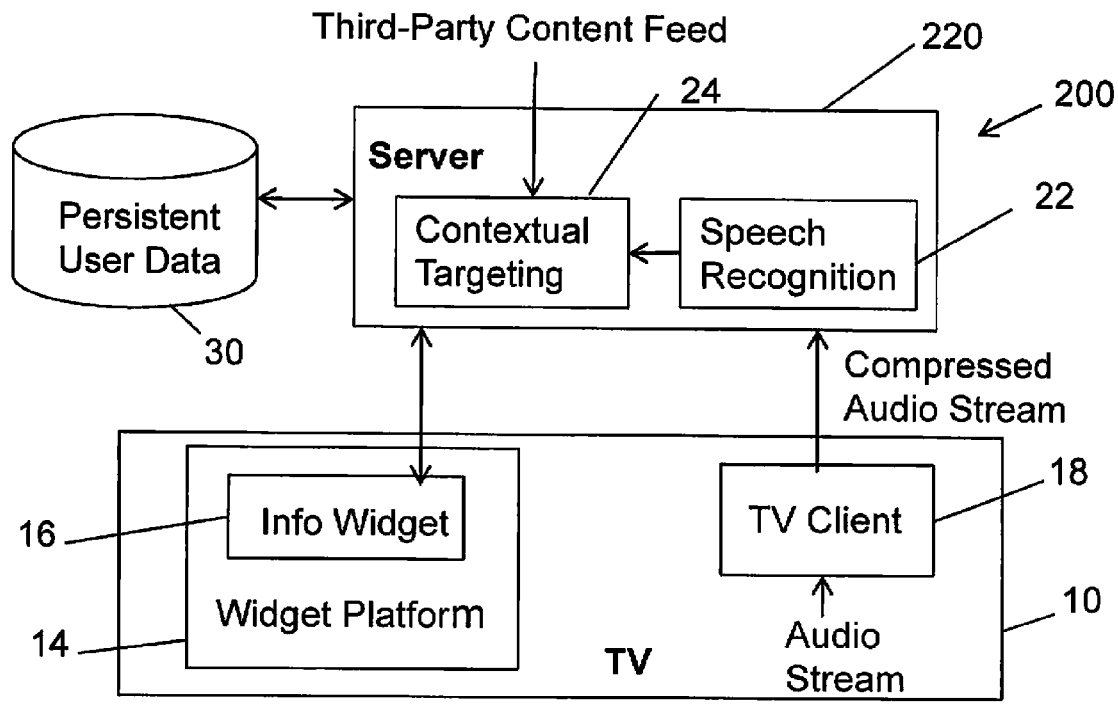
FIGS. 6-10 are block diagrams showing systems in accordance with further embodiments of the invention.

Referring to FIG. 6, a system 200 comprises a remotely located television 10 connected to a centrally located server 220 via a wide area network (not shown). The television 10 comprises a multi-pixel screen, a processor and a port for receiving television signals. The processor of the television is programmed with software comprising a widget platform or engine 14 and a TV client 18 that communicates with the server 220. Any one of a multiplicity of widgets 16 can be displayed on the TV screen by the widget engine. The server 220 has one or more processors and software including a speech recognition module 22 and a contextual targeting module 24. In this embodiment, the client 18 receives the audio stream of the television program or show being viewed, compresses that audio stream and then sends that compressed audio stream to the server 220. The information sent to the server 220 by the TV client 18 may also include a captioning stream (if available) or other metadata and/or channel information. The speech recognition module 22 processes that compressed audio stream to determine which channel is being watched.

In the setup shown in FIG. 6. a lightweight client will be built for the TV operating system (usually Linux) which will capture the audio stream from the TV 10, compress the signal, and stream it over the network to the waiting server 220. This stream has a token attached to it so that the server can associate the stream with a particular user and/or TV. The server may then run a real-time speech recognition algorithm 22 on the stream, or a targeting search on the captioning data, and extract keywords/phrases. There are several suitable packages that perform speech recognition. One example is an open source package called Sphinx-4 (http://cmusphinx.sourceforge.net/sphinx4/), which is a speech recognizer written entirely in the Java™ programming language. These keywords/phrases will be attached to the user/TV in question and used by the contextual targeting module 24 to deliver content (e.g., content from a third-party content feed) to the widget 16. The server 220 stores user information, such as the TV ID, shows or programs viewed on that TV, and selections made using the widget 16 displayed on that TV, in a persistent user database 30.

Figure 7:
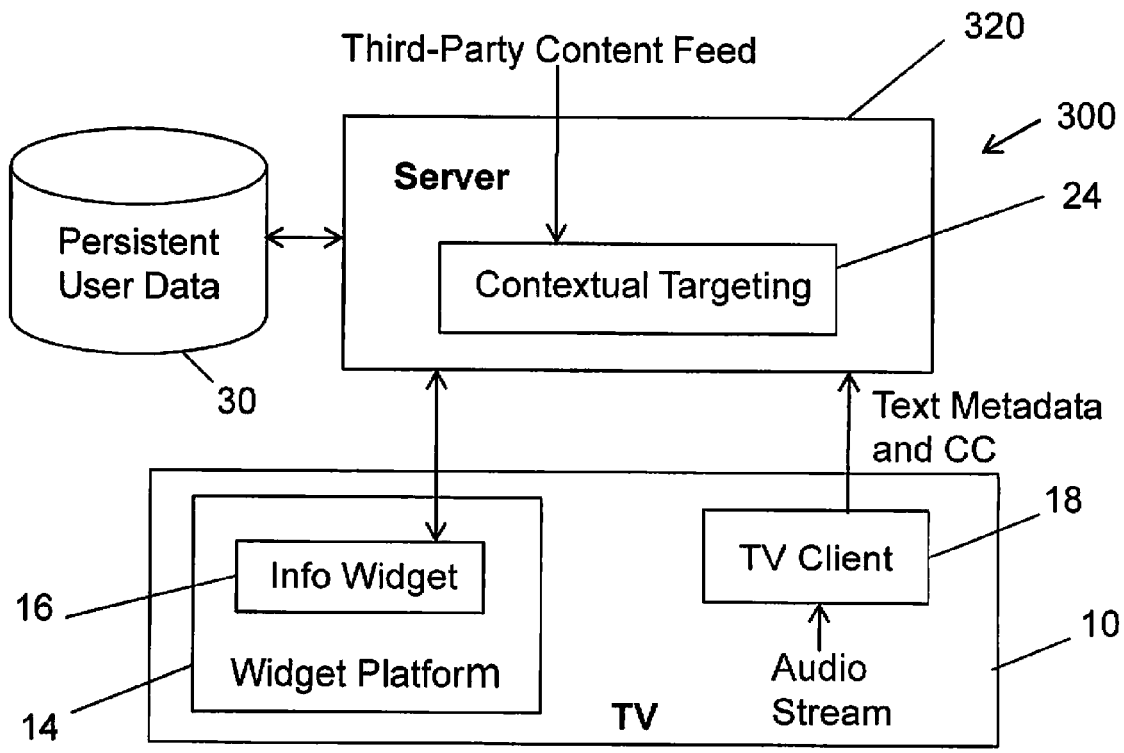
Figure 8:
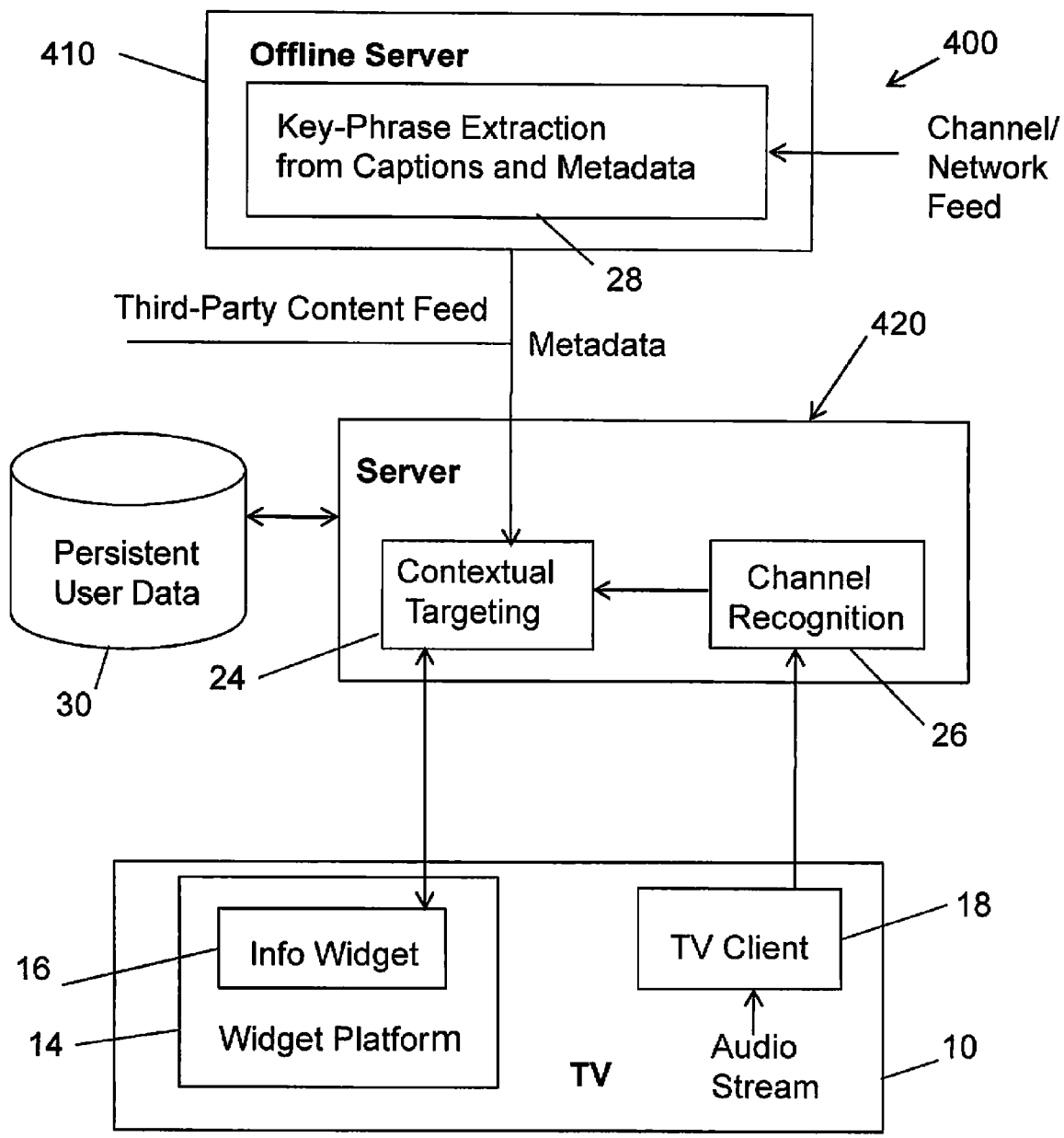

Referring now to FIG. 7, a system 300 comprises a remotely located television 10 connected to a centrally located server 320 via a wide area network (not shown). In this setup a heavier (yet still mostly lightweight) client 18 will be built for the TV operating system which will capture metadata (including captioning data) or it will capture the audio stream from the TV, run a more limited algorithm to determine relevant subjects, and send the server 320 only the keywords/phrases extracted. In one embodiment, a speech recognition client 18 would look to the server 320 to periodically update its Dictionary and Language Model. There are several packages that provide lightweight speech recognition for mobile and embedded devices (which the TV is similar to since it does not have a powerful CPU). A good example is the mobile version of the aforementioned open source Sphinx-4 package called PocketSphinx (http://cmusphinx.sourceforge.net/html/compare.php). The keywords/phrases will be attached to the user/TV in question and used by the contextual targeting module 24 to deliver content (e.g., content from a third-party content feed) to the widget 16. Again the server 320 stores user information, such as the TV ID, shows or programs viewed on that TV, and selections made using the widget 16 displayed on that TV, in a persistent user database 30.

Referring now to FIG. 8, a system 400 comprises a remotely located television 10 connected to a centrally located server 420 via a wide area network (not shown) and one or more offline servers 410 connected to the server 420 via a local area network (not shown). The server 420 has software comprising a contextual targeting module 24 and a channel recognition module 26. In the setup shown in FIG. 8, the offline servers 410 continually receive feeds corresponding to a set of TV channels, run a heavier more powerful algorithm, and tag each channel with metadata. A lightweight TV client 18 (part of the TV operating system) sends just enough information to the server 420 to enable the latter to identify the channel being viewed. FIG. 8 shows that the TV client receives the audio stream of the television program being viewed and then extracts audio data to be sent to the server 420, so that the latter can identify the channel being viewed by, e.g., detecting audio signatures. Alternatively, the TV client 18 may send pixel or audio cues (consisting of batches of pixel or audio data samples) to the server 420, and the server 420 may identify the channel being viewed by processing ambiguous pixel or audio cues using the technique disclosed in the Appendix hereto. For example, the TV client 18 may send pixel cues to the server 420, in which case the channel recognition module 26 would comprise suitable video pixel cue processing software of the type described later with reference to FIG. 10. In accordance with yet another alternative embodiment, the TV client 18 may receive the video stream and extract image data to be sent to the server 420, so that the channel recognition module 26 can identify the channel being viewed using image recognition software.

Based on the information received from the TV client, the server 420 can readily identify the video segment being viewed and the offset time from the start of the program. The online server 420 will match the channel the viewer is watching with one that is being tagged by the offline servers 410 and feed the contextual targeting module 24 with the appropriate keywords/phrases previously provided by the offline server. These keywords/phrases will be attached to the user/TV in question and used by the contextual targeting module 24 to deliver content (e.g., content from a third-party content feed) to the widget 16. The offline servers need not operate in real-time. Metadata (including the aforementioned keywords/phrases) can be loaded into the memory of server 420 by the offline servers periodically, e.g., hourly or daily. In addition, despite the fact that the offline server 410 is collecting a live network feed, viewers may be watching the same content delayed by several hours or even days. The online server 420 will match a channel and a respective time index into that channel for programs that are live as well as in the past. The offline server 410 and the channel recognition module 26 are configured to keep programs cues and metadata for a specified period of time (usually days or weeks).

Still referring to FIG. 8, another setup can be that in addition to (or instead of) the network feed to the offline server 410, a batch feed of programs is loaded into the offline server 410 at regular intervals. Since the offline server 410 keeps cues and metadata for a specified period of time, this setup forms a library of program cues and metadata that is particularly useful to viewers that are watching content on DVRs or DVDs. Note that programs may be loaded by a batch feed that are not available in the network feed.

In accordance with a further aspect of the invention, a hybrid solution is possible. One reasonable setup would have to be a hybrid solution that would use each of the above approaches where they best fit. Since there are many possible TV configurations, no one solution will be ideal for all viewers. For those viewers where the channel/network data is available (for example, when a user is watching TV over the air or has downloaded/streamed the content from an On-Demand service) or where the audio feed can be recognized as a known channel, the offline computation approach (shown in FIG. 8) would be preferred. For those cases where bandwidth is not available to stream the audio, the speech recognition client on the TV (see FIG. 7) will be used to handle the most popular keywords. While for viewers watching DVDs or using a DVR, the streaming feed to the server (see FIG. 6) will provide better/deeper analysis. In cases where detection of a channel or a set of specific programs is preferable, only cues will be sent to be matched on the server (see FIG. 8). The system would decide which method to use in individual cases based on criteria such as: the success rates of the various methods; customer histories and value to advertisers; and available bandwidth or computational power.

Figure 9:
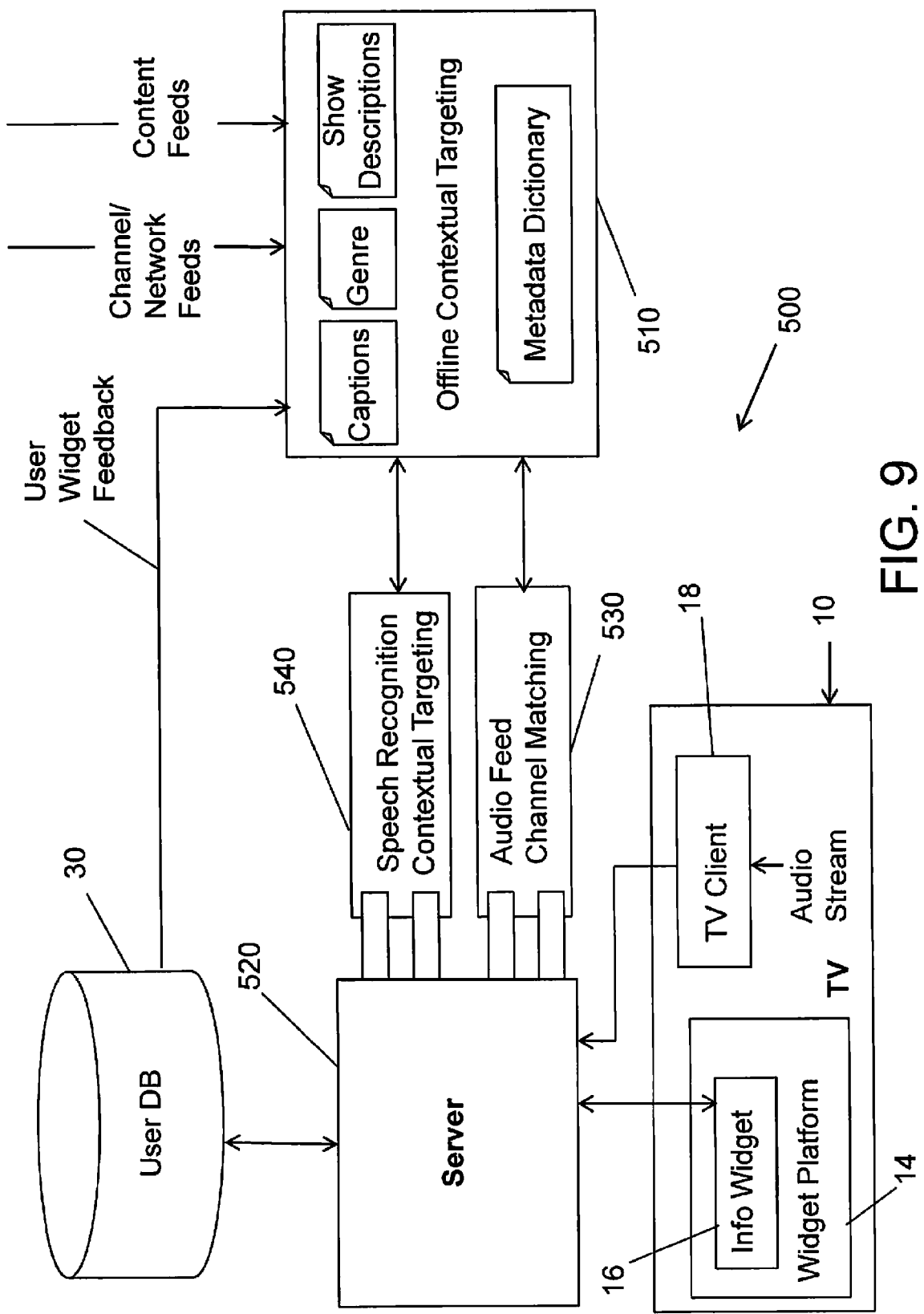

In accordance with yet another embodiment of the invention shown in FIG. 9, a system 500 comprises a server 520 that maintains a user-specific database 30 that communicates with an offline contextual targeting server 510. The offline contextual targeting server 510 receives input from the database 30 and from channel or network feeds and content feeds. It then provides information to the server 520, which communicates processed information based thereon to the connected television 10.

More specifically, the system 500 comprises a TV 10 having a widget platform 14 and a client 18; an offline server 510 on which a contextual targeting engine is running; a server 520 having an audio feed channel matching module 530 and a speech recognition contextual targeting engine 540; and a viewer database 30. The system 500 is programmed to figure out what the viewer is currently watching, which we is done using the audio stream that comes into the television 10. There are many possible TV setup possibilities and most of them "lose" the most valuable metadata sources like captions, channel information, and show descriptions. In particular, most cable box configurations connected to the TV via an HDMI cable are very poor in metadata. The audio and video feeds are the lowest common denominator and are prevalent in all setups. FIG. 9 shows the TV client 18 and the audio feed channel matching module 530 using the audio stream for detection of the channel being viewed by, e.g., detecting audio signatures. Alternatively, the TV client 18 may send pixel cues (consisting of batches of pixel data samples) to the server 520, and the channel matching module 530 may identify the channel being viewed by processing ambiguous pixel cues using the technique disclosed in the Appendix hereto. In the particular embodiment depicted in FIG. 9, the TV client module 18 is a lightweight client for the TV operating system which will capture the audio stream from the TV, compress the signal, and stream it over the global computer network (not shown in FIG. 9) to the server 520. This audio stream has a token attached to it so that the server 520 can associate the audio stream with a particular TV/viewer.

The server 520 receives the audio stream from the TV 10, associates it with a given TV/viewer, and sends the audio stream to either the audio feed channel matching module 530 or, if that fails, to the speech recognition contextual targeting engine 540 for tagging. Once tagged with targeted content, the server 54 then sends the targeted content back to the widget 16 on the TV 10.

The server 520 comprises an audio feed channel matching module 530 that tries to match the audio feed streamed from the TV 10 to a set of several hundred known live feeds of the most popular cable channels from around the country. If a viewer is watching a known channel, they are tagged with metadata gathered by the contextual targeting engine running on the offline server 510. Those that are not are processed by the speech recognition contextual targeting engine 540. It is not necessary to monitor every possible channel from the entire country since the speech recognition targeting engine 540 serves as a backup option. In addition, since this is a continuous process, channel changing is detected and in fact increases the pool of relevant tagging by adding subject/keywords from multiple channels.

The contextual targeting engine is software running on an offline server 510. Alternatively, a plurality of offline servers can be utilized. The offline server 510 is hooked into live feeds of popular cable and network channels from around the country. These feeds can be configured to expose all of the useful metadata that is missing on the client televisions. In particular, closed captioning data, show descriptions, and channel genre power a contextual targeting engine that tags each channel with timely subject/keyword information. Since each channel has to be processed only once (instead of once per client TV), far more powerful algorithms can be run in real time. The metadata dictionary that is the product of this process is continuously refined by the actual responses of the viewers who use the widget. These responses are sent from the widget 16 to the server 520, stored in the user database 30, and sent to the offline server 510 as indicated by the arrow labeled "User Widget Feedback" in FIG. 9. Keywords that widget viewers interact with are given priority by the contextual targeting engine while those that are ignored are downgraded. The result is an ever more accurate metadata dictionary of what is currently on the TV 10.

As previously mentioned, the server 520 includes a speech recognition contextual targeting engine 540. For those viewers tuned to channels that are not recognized, playing DVDs, or using DVRs, a real-time speech recognition solution is used to extract the subject/keywords. Since speech recognition systems can only use limited dictionaries, what makes this solution practical is the fact the contextual targeting engine running on the offline server 510 is already maintaining a concise dictionary of subject/keywords that are currently prevalent in television programs and known to engage widget viewers. This system would be particularly effective for viewers using DVRs since the material playing was likely recorded in the recent past (in many cases only delayed by several hours) and was therefore already tagged in the offline process and its metadata refined by feedback from the widget. Still referring to the embodiment shown in FIG. 9, the widget 16 on the television 10 leverages the targeting done by all the other components described above and is the only part of the system that the viewer actually sees. Unlike normal Konfabulator widgets which must be periodically updated with a new look-and-feel, the contextual targeting widget 16 changes its presentation at any given time depending on the content that is being targeted.

A preferred embodiment of the present invention will now be disclosed. Although the system to be disclosed includes a connected TV having a widget engine and client software (for generating, e.g., pixel cue points) resident therein, it is within the scope of the invention to place that widget engine and client software on collocated equipment, such as an STB, a DVR or a DVD player that provides television signals to the connected TV. Also, although the system to be disclosed samples and then processes pixel values, the values sampled and processed could, in the alternative, be audio values or metadata such as closed captioning.

Figure 10:
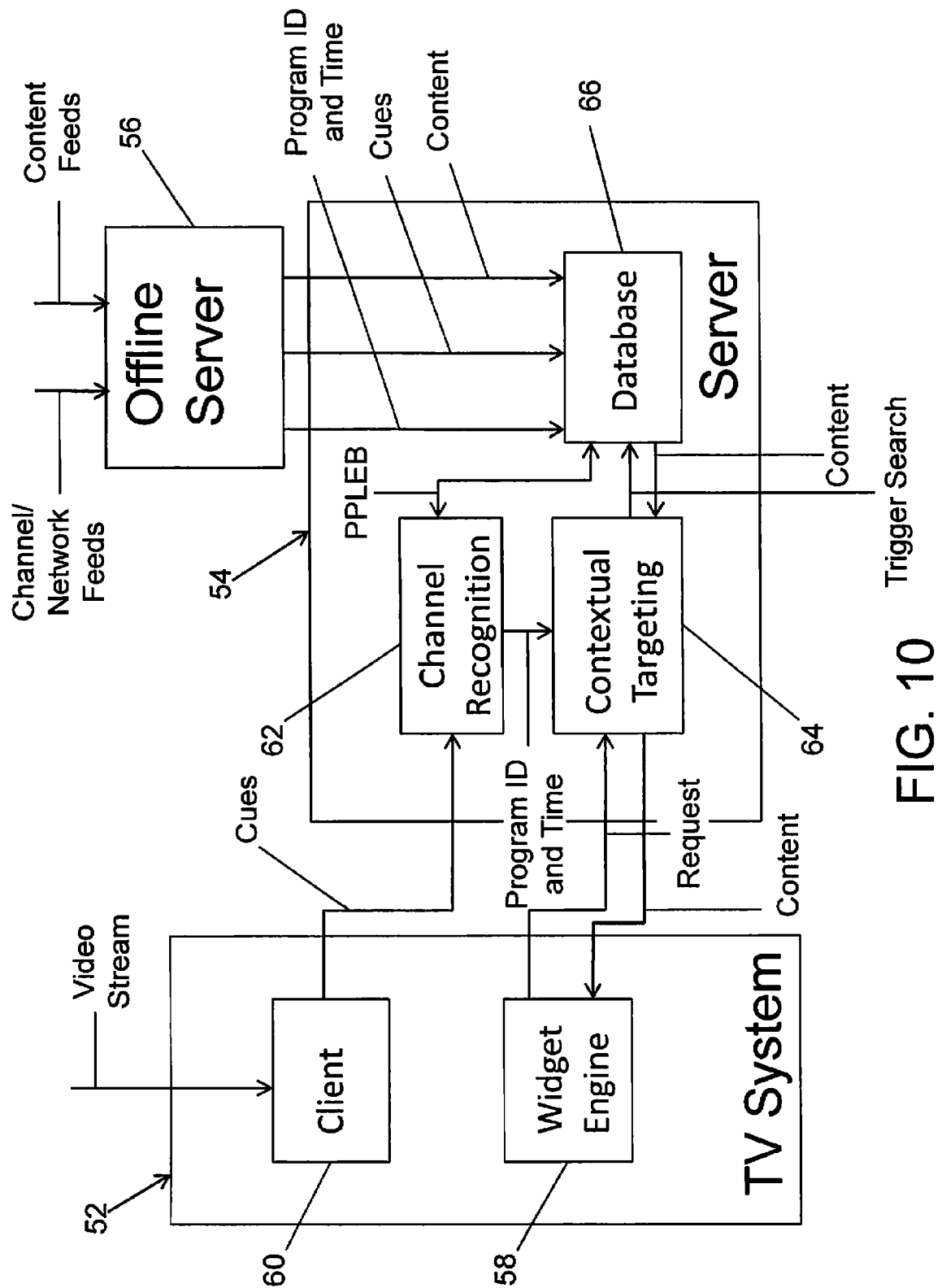

The main components of a system in accordance with the preferred embodiment shown in FIG. 10 include a television system 52 and a first server 54 which communicate via a network, e.g., the Internet. In addition, the system comprises a second server (hereinafter referred to as an "offline server") 56 that communicates with the first server 54 via a network, preferably a local area network (LAN).

FIG. 10 shows the functional components of interest of the television system 52, first server 54 and offline server 56. The television system 52 comprises a television having a multi-pixel screen (not shown in FIG. 10) and at least one other component (also not shown) that provides television signals to the television. For example, such other television component may comprise a STB, a DVR or a DVD player. The television system 52 further comprises a processor (not shown in FIG. 10). That processor may be incorporated in either the television or in the at least one other component of the television system.

Still referring to FIG. 10, the processor of the television system is programmed with software comprising a widget engine 58 and a client 60. Consistent with the previous statement regarding the location of the television system process, the widget engine and client software may reside on either the television or on the at least one other component of the television system. Furthermore, it should be appreciated that, in the alternative, the widget engine and the client software could run on separate processors included in the television system 52.

In either case, the client module 60 is programmed to sample pixel data and generate an HTTP request addressed to server 54 based on the sampled pixel data. That HTTP request comprises a time stamp and a plurality of strings of RGB (or hex) values, the latter being referred to herein as "a pixel cue point". Each pixel cue point comprises a respective subset of the RGB (or hex) values making up a respective "frame" of the video segment being displayed on the television screen, as will be explained in greater detail below. [In reality, digital video does not have frames. The system disclosed herein samples at a time rate, e.g., samples every amount of time T.]

At this juncture, it should be further noted that server 54 comprises a processor and memory, neither of which are indicated in FIG. 10). However, FIG. 10 does indicate that the server 54 has at least the following software components: a channel recognition module 62, a contextual targeting module 64 and a database 66 which comprises a library of indexed content. The channel recognition and contextual targeting modules run on the server process. The library data itself needs to be stored in a persistent yet readily available format that can be quickly searched. The simplest way to do this is to load the library into a data structure in the server memory. Another option is to store most of the library on a disk.

The channel recognition module 62 comprises a points management submodule and a user management submodule (not shown in FIG. 10). The points management submodule searches the database 66 in two ways: (1) a search of the entire library for a given set of points, returning all the suspects that are close to a match; and (2) a search for a given set of points and a given suspected location, returning whether the user is indeed where the currently stored data indicates. [A "user" is a unique TV or other device identified by a globally unique ID.]

The user management submodule keeps the user's session and uses the results from the points management submodule to match a location (in the viewed video segment) to a specific user. It also keeps configurations and tolerances used to determine when and how a match is made. The user management submodule also includes a session manager. The user management submodule matches the user's location based on an HTTP request received from the TV client module 60. If the user ID already has session data, the HTTP request is routed to the user management submodule attached to this session (session persistence). The user management submodule looks at the user's history and decides what kind of search request (if any) to make to the points management submodule. If the user's location is a suspect, the points management submodule will be called to do a brute force search around that location. If the user's location is not known, the points management submodule will be called to do a probabilistic global search. The user management submodule saves the updated location in the user's session.

As indicated by the arrow labeled "CUES" in FIG. 10, the client module 60 sends the user management submodule of the channel recognition module 62 a regular update with pixel cue information. This communication is done via the aforementioned HTTP request and the pixel cue information is sent over GET parameters.

The following is an example of one such HTTP request:
http://SERVER_NAME/
index?token=TV_ID&time=5799&cueData=8-1-0, 7-0-0, 170-158-51, 134-21-16, 3-0-6, 210-210-212, 255-253-251, 3-2-0, 255-255-244, 13-0-0, 182-30-25, 106-106-40, 198-110-103, |28-5-0, 3-0-2, 100-79-2, 147-31-41, 3-0-6, 209-209-209, 175-29-19, 0-0-0, 252-249-237, 167-168-165, 176-25-17, 113-113-24, 171-27-32, |38-7-0, 2-2-2, 99-70-0, 116-21-31, 6-0-9, 210-210-210, 179-31-22, 31-31-33, 162-65-64, 10-10-10, 184-33-25, 105-108-32, 169-28-28, |104-86-15, 4-4-4, 46-18-0, 178-112-116, 0-0-1, 213-213-213, 178-31-22, 211-211-211, 164-62-72, 0-0-0, 183-32-24, 150-149-42, 153-27-19, |188-192-43, 2-1-6, 67-49-0, 156-92-95, 3-1-2, 215-215-215, 177-28-19, 226-233-53, 249-247-247, 207-211-21, 182-31-23, 136-153-47, 152-25-18, |192-118-109, 176-181-84, 201-201-201, 218-172-162, 201-200-39, 226-226-226, 244-244-244, 221-214-212, 166-165-170, 209-209-209, 191-26-36, 154-28-20, 150-21-15, |0-3-0, 0-0-0, 156-27-22, 161-28-19, 192-192-26, 157-26-22, 174-29-23, 149-23-18, 190-34-25, 156-27-20, 176-27-18, 0-0-0, 184-30-25, |159-29-19, 9-3-0, 161-26-22, 137-22-15, 0-4-9, 167-26-26, 159-28-25, 165-27-24, 65-21-13, 154-22-19, 99-24-11, 153-24-20, 185-34-28, |153-26-21, 0-0-0, 165-25-15, 141-24-13, 1-1-1, 165-25-17, 154-27-24, 182-32-26, 180-31-25, 149-25-17, 155-21-19, 36-12-4, 171-29-22, |153-26-21, 0-0-0, 165-25-15, 141-24-13, 1-1-1, 165-25-17, 154-27-24, 182-32-26, 180-31-25, 149-25-17, 155-21-19, 36-12-4, 171-29-22, |

The parameters contained in this HTTP request are as follows:

The parameter "token" is a unique identifier for the TV (or other device). Each TV has a globally unique ID assigned by the manufacturer. This ID is sent to the user management submodule of the channel recognition module 62 shown in FIG. 10.

The parameter "time" is an arbitrary time stamp used to keep requests in order and to aid in the calculation of "the most likely location" described below. This parameter is usually provided by the TV's internal clock.

The parameter "cueData" is a list of RGB values, e.g., samples of pixel values composed of RGB combinations. The format is R1-G1-B1,R2-G2-G2, . . . |R3-G3-B3, R4-G4-B4, . . . |etc., where each RX-GX-BX indicates a respective RGB Location. RGB Location1, RGB Location2, RGB Location3, etc. form a sample. Sample1|Sample2|Sample3|etc. form the HTTP request. [In the claims appended hereto, these samples are referred to as "pixel cue points".] The term "RGB Location" should be construed broadly enough to encompass the set of RGB values for an individual pixel identified by its X and Y coordinates, as well as a set of RGB values which is a function of the RGB values for a plurality of individual pixels in an array (e.g., a square array). In the latter case, the collection of individual sets of RGB values for all of the pixels in the array is referred to as "PatchData". The array of pixels will be located in a given area (e.g., a square area) on the television screen.

In the foregoing example, the cueData parameter of the HTTP request has 10 samples, one sample per video frame, each sample consisting of the RGB values for 13 pixels or 13 pixel arrays, the same pixels or pixel arrays being acquired for each of the ten frames. However, the number of pixel values for each frame, the location of pixels sampled, and the number of samples in the HTTP request can be varied in accordance with point sampling instructions received by the TV client component.

In accordance with the embodiment depicted in FIG. 10, the television system 52 has a system level function that extracts the pixel information. This function wakes up periodically, e.g., every 0.1 second, and extracts pixel data from N patches for each "frame" of pixel data, where N is a positive integer (e.g., 13). The pixel data from each patch is reduced to a single pixel sample, i.e., a single set of RGB values, which single pixel sample is a function of the pixel data in a respective patch. That function may be averaging, weighted averaging or any other suitable function. The pixel samples for a succession of "frames" (e.g., 10) are accumulated and then sent to the server. For example, the TV client sends a batch of pixel samples to the server periodically, e.g., every 1.0 second.

An exemplary API specification file (written in the C computer language) is presented below. This API is part of the TV client module 60, which software runs on a chip set incorporated in the television system. The specific functions defined in the following API specification are implemented by that chip set.

```
/*
 * TVCaptureAPI.h
 *
 */
#ifndef TVCAPTUREAPI_H_
#define TVCAPTUREAPI_H_
    /**
     * A class holding a single pixel
     * The pixel can be saved either as an RGB combination or
as the hex value.
     *
     */
    typedef struct pixel {
        int red;
        int green;
        int blue;
        long hexValue;
    } Pixel;
    /**
     * A class representing a rectangular patch of the video
plane
     * The rectangle is defined by its top left and bottom
right corners
     */
    typedef struct patch {
        int topLeftX, topLeftY;
        int bottomRightX, bottomRightY;
    } Patch;
    /**
     * A class holding a snapshot in time of the pixel data
for a patch
     * pixelData is an array of pixels starting from the top
left corner and going down row by row
     * numOfPixels is clearly just for convenience since it is
derived from the left and right corners
     */
    typedef struct patchData {
        int topLeftX, topLeftY;
        int bottomRightX, bottomRightY;
        int numOfPixels;
```

-continued

```
    Pixel* pixelData;
} PatchData;
/**
 * Returns an array of PatchData objects for the requested
patches.
 * Each patchData contains a snapshot of the pixel data
for that patch on the video plane at that moment.
 *
 * @param: requestedPatches    an array of patches for
which you want to get back data.
 * @return:                    an array of data
corresponding to the requested patches.
 */
    PatchData* getPatchesFromVideo(Patch *requestedPatches,
int numOfPatches);
    /**
 * Cleans up the patchData created by getPatchesFromVideo
 * You MUST call a cleanup every time you call
getPatchesFromVideo
 *
 * @param: o           the pointer to the PatchData
that was returned by getPatchesFromVideo
 * @param: numOfPatches   the number of patches
 */
    void freePatchData(PatchData* o, int numOfPatches);
    /**
 * Returns the dimension of a patch covering the entire
video plane (i.e. a fancy way of saying the dimensions of the video).
Note that this may not be just the screen size depending on where in
the pipeline the video is captured since video can be stretched to fit
etc.
 *
 * @param ret         a pointer to the return object.
This will get populated with a patch object whose top left corner is
0,0 and whose bottom left corner is the bottom left of the video
 *
 * @return            0 if success. −1 if failed.
 */
    int getVideoDimensions(Patch *ret);
    /**
 * Returns a unique ID for this device. This will be used
to share metadata extracted for this TV with any equipped widget
running on the TV.
 *
 * @param: buff       the return string buffer.
 * @param: max_len    the maximum length of the ID
 *
 * @return:           the number of characters in the
ID if successful.
 *    If the ID had to get truncated, a negative value of
the actual number of characters is returned.
 *
 */
    int getTVID(char* buff, int max_len);
#endif /* TVCAPTUREAPI_H_ */
```

The API file includes declarations of three data structures of interest: "Patch", "PatchData" and "Pixel". The pixels in the television screen are arranged in an X, Y plane, each pixel being identified by its X and Y coordinates. A "Pixel" is composed of three integers (e.g., RGB values). [Alternatively, the declarations can be populated by hex values.] A "Patch" is the coordinates of a square on the TV screen, each square including an array of pixels. The term "PatchData" is a collection of "Pixels" in a given square on the screen. One note on syntax; in the C language, the term "Pixel*" means a collection of "Pixel". So the line "Pixel*pixelData;" means a collection of "Pixel" arbitrarily named "pixelData". The function:

```
    PatchData* getPatchesFromVideo(Patch *requestedPatches,
    int numOf Patches);
```

Is implemented by a chip set inside the television system and means the function "getPatchesFromVideo" returns a collection of "PatchData".

Referring again to FIG. 10, in accordance with a preferred embodiment the TV client module 60 is programmed to acquire the RGB values for each pixel included in each array (i.e., Patch). The collection of RGB values for each pixel array or Patch are then processed to generate a respective set of RGB values for each pixel array or Patch. In other words, in the case of a 3×3 pixel array, the collection of nine sets of RGB values is reduced to a single set of RGB values. Many different mathematical functions can be utilized to perform this operation, e.g., averaging or weighted averaging. The HTTP request sent by the TV client 60 to the channel recognition module 62 in the server 54 will include a single set of RGB values (i.e., three integers) for each Patch and will not include all of the PatchData for each Patch.

The TV client module 60 is an embedded piece of code that gets "baked" onto a chip of the TV or other device and sends the captured points to the user management submodule of the channel recognition module 62. The TV client module can be updated in the field with firmware updates. In accordance with one embodiment, the TV client module 60 requests instructions from the server 54 periodically to determine the number of points to sample, the frequency, the locations, etc. The TV client module need not send the server points at the same rate that it samples them. In accordance with one embodiment, the TV client module samples about 10 times per second and batches up the resulting points, sending them to the server every second or so. The TV client module needs to know which component of the user management submodule has its sessions. During initialization (and periodically thereafter), the TV client module calls the user management session manager to get an address of a user management component. The user management component assigned to a given TV or other device keeps that user's session information. In cases where the assigned user management component is not available (e.g., if it crashed), the session manager assigns a new user management component. The TV client module also needs an arbitrary time stamp to keep its requests in order and give positioning information to the associated component of the points management submodule.

In response to receipt of the HTTP request from the client module 10, the channel recognition module 62 identifies in real time what video segment the cueData in the HTTP request is taken from and in what time offset from the starting time of the segment. As previously mentioned, the segment and offset together are referred to as the "location". The points management submodule of the channel recognition module 62 uses a path pursuit algorithm that searches the database 66 for those pixel cue points stored in the database which are nearest to the pixel cue points received in the HTTP request. This is accomplished in the manner which is described in detail in the Appendix entitled "The Path Pursuit Problem: Tracking Video Transmission Using Ambiguous Cues," the entire contents of which are incorporated by reference herein. The double-headed arrow labeled PPLEB in FIG. 10 indicates that the points management submodule of the channel recognition module communicates with the database 16 while performing the path pursuit algorithm, which comprises an algorithm named Probabilistic Point Location in Equal Balls (PPLEB) and an efficient likelihood update algorithm. The Appendix explains the methodology for identifying the most likely "location" in detail, including mathematical equations. The following more succinct explanation of the search methodology is also provided.

The path pursuit algorithm disclosed in the Appendix uses a mathematical construct called locality sensitive hashing. In the prior art, it was known to map each point in a data set to a word, which is a list of its hash values. These words were placed in a sorted dictionary (much like a common English dictionary). When a point was searched, the algorithm first constructed its word and then returned its closest lexicographical match in the dictionary. This required computing each letter in the word separately and performing a dictionary search. In the version disclosed in the Appendix, fixed length words (depending only on the norm of the point vector) are constructed and then the points management submodule of the channel recognition module looks in the dictionary only for exact word matches. This has two advantages. First, computing the word corresponding to a point can be done in batch, more efficiently than letter by letter. Second, the dictionary search is made faster and simpler using traditional hash functions instead of a dictionary.

It should be appreciated that the search for the location (i.e., video segment plus time offset) seeks the most likely suspects. The path pursuit algorithm first finds the suspect locations and then computes a probability distribution for those suspects. More specifically, each suspect location is assigned a probability indicating the likelihood that it matches the video segment being displayed on the television screen. If the probability for suspect locations having the greatest probability exceeds a preset threshold, then the decision is made that the suspect location corresponds to the video segment being displayed. Otherwise the path pursuit algorithm continues to update the list of suspect locations and their probability distribution as successive received pixel cue data points are processed.

The path pursuit algorithm is a probabilistic approach: an exact matching of pixel cue points at all times is not needed. Instead the decision that the result is true is made based on the aggregated evidence. The algorithm tracks in real time all of the time and is able to handle intermittent pixel cue points in a sequence that deviate from the other pixel data points in that sequence. For example, the algorithm may only recognize 7 out of 10 frames of a video segment, but is still able to identify the most likely location. The algorithm also responds quickly to the television viewer pausing, changing channels, etc.

Upon receipt of a first pixel cue point from the television system, the server computes a probability distribution for all suspect locations. Upon the receipt of each subsequent pixel cue point from the same television system, the list of suspect locations is updated and an updated probability distribution is computed for those updated suspect locations. This iterative process continues in real time at all times, allowing the viewing habits of the user to be closely monitored. Each pixel cue point received from the television is discarded after it has been processed. The history of the suspect locations and their probability distributions is retained in memory for each user session. However, if a particular suspect location becomes less likely (e.g., has a probability below a preset lower threshold), then that suspect location can be ignored, i.e., deleted from the stored history.

It should be further noted that it would be inefficient to search the entire pixel cue library for every television system. To increase search efficiency, the pixel cue data in the database is divided into sections. The search for nearest neighbors is conducted in only one section. Further details concerning this aspect can be found in the Appendix.

Once the most likely location in the database is identified, content stored in the database in association with that location can be retrieved by the contextual targeting module 64 (see FIG. 10). In accordance with the preferred embodiment, by the contextual targeting module 64 receives the program ID and the time offset of the most likely suspect location (i.e., the suspect location having the greatest probability provided that probability exceeds a threshold for success which is presettable) from the channel recognition module 62 and then uses that information to retrieve the associated enhanced content from the database 66. The database contains closed captioning for the video segments whose identifiers and pixel cue points are stored therein. The database also contains an encyclopedia of content consisting of triggers (i.e., single words or short sequences of words and proper nouns that refer to specific subjects relatively unambiguously) extracted from documents and respective content associated with each trigger. The encyclopedia is an index of structured content data, preferably organized by categories. The contextual targeting module comprises a search engine that searches the closed captions (stored in the database) associated with the identified location and then identifies any triggers in the relevant closed captioning. This is indicated in FIG. 10 by the arrow labeled "Trigger Search". The contextual targeting module then retrieves the content associated with those identified triggers from the encyclopedia in the database. Trigger sets as well as search configurations are customized to specific items of content (i.e. specific television shows, commercials, or movies). For example basketball games are identified as such and the contextual targeting module uses a trigger set comprising names of players/coaches etc. In another example, news and current events shows are configured to use a trigger set that emphasizes politicians' names and current event buzzwords (i.e., "healthcare"). In another example, drama shows and sitcoms are configured to use a trigger set that is composed of arbitrary combinations of words and timestamps meant to trigger events on a given location in the plot without relevance to the subject of the dialog (e.g., an event corresponding to a song which starts playing after a specific point in the plot).

The database 66 is constructed by the offline server 56 (see FIG. 10) which receives channel/network feeds and content feeds. The database is constantly updated as the feeds are received by the offline server.

In accordance with the preferred embodiment, the offline server 56 extracts time stamps, pixel cue points and closed captioning from the channel/network feeds. That extracted information is stored as part of the database 66. More specifically, the database contains the following information for each television program, commercial or other broadcast or video segment: (a) a list of pixel cue points for each video segment; (b) offsets from some fixed point in time, which offsets are respectively associated with the aforementioned pixel cue points, thereby indicating the sequence in time when those pixel cue points occur; and (3) associated metadata (e.g., closed captioning). Preferably the offline server samples the pixel data at the same rate as does the client of the television system. However, it is not necessary that the two machines, when sampling the same video segment, sample at precisely the instances in time.

The offline server 56 also extracts triggers and content from the content feeds. That extracted information, when stored in memory, form the aforementioned encyclopedia which is also part of the database 16. The offline server can also create a customized index for a particular television program.

The offline server 56 may have resident thereon a master source module which indexes content and adds it to the library (i.e., database 66) that the points management submodule searches over. The components of this module are collections of emulators very similar to the TV client components except that they are able to run in Master mode. This mode sends points to the points management submodule is the same way as the standard mode but with metadata attached and with instructions to the points management submodule to add these points to the library instead of searching on them. The master source module operates in any of four modes: (1) Batch; (2) Live; (3) Channel; and (4) UGC. In the Batch mode, content arrives as complete video files well in advance of the "air date." The TV client emulator plays the video files in Master mode, which sends the points to the points management submodule to be added to the library. In the Live mode, a specific live event is set up to be indexed (e.g., a basketball game). A stream is arranged ahead of time to be used to index this content and attached to one of the emulators running in the Master mode. In the Channel mode, an emulator is set up to continuously view and index a given channel. The content comes over the public distribution networks, usually through an STB. A server with a capture card is set up to get the content from the STB and run the emulator. Access to an electronic program guide is also necessary to identify the shows being indexed. In the UGC mode, the TV client module on a given TV or other device can act in the Master mode to add content to the library that the device is currently watching. The master source module also contains a simple database where basic content metadata (name, channel, etc.) are tagged to a unique content ID. This database just lists the content being indexed.

Referring again to FIG. 10, the contextual targeting module 64 is a user-facing application software that targets contents from a pre-defined repository on the closed captions stream for the current piece of content being watched. This module relies on the user management and points management submodules and the master source module to operate since its ability to retrieve the relevant closed captioning information is clearly dependent on correct content detection.

More specifically, the contextual targeting module 64 sends retrieved content to the particular widget running on the widget engine 58 of the television system 52 in response to a request from that widget. More specifically, the widget running on the TV's widget engine (or any other GUI on the TV) sends the server 54 a request for show information, metadata, and contextual targeted content on a regular basis. The specifics of the request depends on the specific functionality required by the TV application software. The following are some examples of responses from the server.

The first response is an example response from the server for a request for contextually targeted content based on closed captions:

```
{"createdOn": "Sun Nov 22 11:38:40 2009",
"token": "TV_ID",
"channel": "The Colbert Report Tue May 19 2009", "channelTime": "34951",
"myContent": [
    {
        "searchKey": "Walter_Kirn",
        "displayName": "Walter Kirn",
```

```
        "matchFactor": 3.2706767671099999e-06,
        "foundIn": "THEN MY GUEST WALTER KIRN SAYS  ",
        "engineName": "triggerSearch",
        "rank": 3.2706767671099999e-06,
        "matchedText": "walter kirn"
    },
    {
        "searchKey": "Sammy_Hagar",
        "displayName": "Sammy Hagar",
        "matchFactor": 3.6402208460499996e-05,
        "foundIn": "SCOFFLAW SINCE SAMMY HAGAR  ",
        "engineName": "triggerSearch",
        "rank": 3.6402208460499996e-05,
        "matchedText": "sammy hagar"
    },
    {
        "searchKey": "Republican_Party_%28United_States%29",
        "displayName": " Republican Party (United States)",
        "matchFactor": 0.0001940746083739999,
        "foundIn": "REPUBLICANS HAVE FOUND A WAY TO  ",
        "engineName": "triggerSearch",
        "rank": 0.0001940746083739999,
        "matchedText": "republicans"
    },
]
}
```

The parameters contained in this first exemplary response to the HTTP request are as follows:

The parameter "createdOn" is a timestamp of the date/time the user session was created. This parameter is used for keeping track of how long the user is watching TV.

The parameter "token" is the same unique identifier for the TV previously described herein. This ID is used to tie the Channel Recognition component with the Contextual Targeting component.

The parameter "channel" identifies the program being watched by name and broadcast date.

The parameter "channelTime" is the playing time (in milliseconds) into the piece of recognized content. The terms "playing time" and "offset time" are used interchangeably herein and are intended to have the same meaning.

The parameter "myContent" is a list of content targeted for this location in the show based on closed captions. Three exemplary content items have been included under this parameter. The parameters for each content item are as follows: "search Key" is a unique identifier for the particular content item; "displayName" is a title for the particular content item; "founding" is the line of closed captioning that matched the particular content item; "engineName" is the internal search engine used (a selected one of a plurality of search engines with different algorithms, optimized for different kinds of shows, can be utilized); and "matchedText" is the specific text in the closed caption stream that triggered the search engine match for the particular content item.

What follows is an exemplary response from the server for a request for contextually targeted content from a custom index for a specific show:

```
{
    "widget": "CNN",
    "myContent": [
        {
            "searchKey": "/2008/07/08/the-us-christian-military/",
            "byLine": "Randi Kaye - AC360 Correspondent",
            "displayName": "The U.S. Christian military?",
            "startTime": 290000,
            "images": [
```

```
"/assets/art_soldiers_pray.jpg"
            ],
                    "engineName": "AC360timeSearch",
                    "abstract": "Is the United States Military becoming a
Christian organization? That's what one U.S. soldier tells us.
I met Army Specialist Jeremy Hall in Kansas City a few weeks
ago. He's based at Fort Riley, in Junction City, ... this isn't
happening?" ,
                    "endTime": 100000000,
                    "publishDate": "7/8/2009"
        },
        {
                    "searchKey": "/2009/11/10/armygains-with-muslim-soldiers-
may-be-lost/",
                    "byLine": "Mark Thompson - Time",
                    "displayName": "Army gains with Muslim soldiers may be
lost",
                    "startTime": 290000,
                    "images" [
"fort.hood.shootings/story.memorial.mon.gi.jpg"
        ],
                    "engineName": "AC360timeSearch",
                    "abstract": "Less than 1% of America's 1.4 million troops
are Muslim - and that number is only the military's best guess,
since just 4,000 troops have declared ... may be impossible.
Hasan is in intensive care at a San Antonio hospital,
breathing without a respirator. But given his mental state,
even he may not know what caused him to kill.",
                    "endTime": 100000000,
                    "publishDate": "11/10/2009"
        },
        {
            "searchKey": "/2009/11/09/murderhas-no-religion/",
            "byLine": "Arsalan Iftikhar - AC360 Contributor",
            "displayName": "Murder has no religion",
            "startTime": 115000,
            "images": [
"/art.prayer.02.cnn.jpg"
            ],
                    "engineName": "AC360timeSearch",
                    "abstract": "Most of the world's 1.57 billion Muslims know
that the Holy Quran states quite clearly that, \"Anyone who
kills a human being ... it shall be as though ... act of mass
murder no more makes their criminal act \"Islamic\" than a
Christian uttering the \"Hail Mary\" while murdering an
abortion medical provider, or someone chanting \"Onward,
Christian Soldiers\" while bombing a gay nightclub, would make
their act \"Christian\" in nature.",
                    "endTime": 100000000,
                    "publishDate": "11/9/2009"
```

The parameters contained in this second exemplary response to the HTTP request are as follows:

The parameter "widget" is the ID of the custom application software using this data source.

The parameter "myContent" is a list of content targeted for this location in the show based on closed captions and other metadata.

The parameter "searchKey" is a unique identifier for this content.

The parameters "startTime" and "endTime" limit a particular content item to specific areas of the show.

The parameter "engineName" is the internal search engine used (in this case it is a CNN specific search engine that uses an index composed of Anderson Cooper blog entries).

The parameters "byline", "images", "abstract" and "publishDate" are content for display to the user.

In accordance with one method for providing contextually targeted content to the television system 52 of the system shown in FIG. 10, the server 54 performs the following steps: (a) storing a respective data set for each of a multiplicity of video segments, each data set comprising data identifying a respective video segment, data points extracted from television signals for the respective video segment, and associated offset time data indicating the respective sequence in time of the data points extracted from the television signals for the respective video segment; (b) receiving data points from the television system 52 during display of a video segment on the screen; (c) retrieving from the database identifying data and offset time data associated with the data points that best matches the received data points, wherein the identifying data and the offset time data, in combination, identify which portion of the video segment is being displayed on the screen; (d) retrieving from the database content associated with the identified portion of the video segment being displayed on the screen when a threshold likelihood of successful identification is attained or exceeded; and (e) sending the retrieved content to the television system 52.

In accordance with the embodiment depicted in FIG. 10, the database 66 stores pixel cue points and content for a multiplicity of video segments, while the server 54 is programmed to perform the following steps: (a) determining which pixel cue points stored in the database are possible matches to pixel cue points received from a television system 52 via a network; (b) computing a probability distribution for the pixel cue points determined in step (a); (c) retrieving from the database a program identifier and a playing time associated with the pixel cue points determined to have a greatest probability of matching the pixel cue points received from the television system; (d) retrieving from the database content associated with the program identifier and the playing time retrieved in step (c); and (e) sending the content to the television system via the network.

Further, in accordance with a further aspect of the embodiment depicted in FIG. 10, television system 52 comprises a multi-pixel screen and a processor system, the processor system comprising a widget engine and a separate client programmed to generate a request comprising pixel cue points, each pixel cue point comprising a set of pixel values displayed in a predetermined set of pixels of the screen at a respective time, the predetermined set of pixels being a subset of the total number of pixels of the screen.

In accordance with yet another aspect of the embodiment depicted in FIG. 10, the system comprises a network, a server 54 connected to the network, and a television system 52 connected to the network. The television system 52 comprises a multi-pixel screen and a processor system, the processor system in turn comprising a widget engine and a client programmed to send a request addressed to the server and comprising pixel cue points. The server 54 comprises a database 66 for storing pixel cue points and content for a multiplicity of video segments, and a processor system programmed to perform the following steps: (a) determining which pixel cue points stored in the database 66 are possible matches to the pixel cue points received from the television system 52 via the network; (b) computing a probability distribution for the pixel cue points determined in step (a); (c) retrieving from the database 66 a program identifier and a playing time associated with the pixel cue points determined to have a greatest probability of matching the pixel cue points received from the television system 52 via the network; (d) retrieving from the database 66 content associated with the program identifier and the playing time retrieved in step (c); and (e) sending the content to the television system 52 via the network.

In accordance with another method for automatically processing pixel values of a video segment displayed on the multi-pixel screen of television system 52 of the system shown in FIG. 10, the server 54 performs the following steps: (a) storing a respective data set for each of a multiplicity of video segments, each data set comprising data identifying a respective video segment and pixel cue points extracted from the respective video segment, and each pixel cue point comprising a respective subset of a respective set of pixel values making up a respective frame of the respective video segment; (b) receiving pixel cue points from the television system 52 during display of a video segment on the multi-pixel screen; (c) determining which pixel cue points in the database are possible matches to the received pixel cue points; (d) computing a probability distribution for the pixel cue points determined in step (c); and (e) retrieving from the database 66 identifying data associated with the pixel cue points determined to have a greatest probability of matching the received pixel cue points, wherein the identifying data identifies the video segment being displayed on the multi-pixel screen of the television system 52.

To carry out the method described in the preceding paragraph, the server 54 may further comprise a metrics software module (not shown in FIG. 10) that collects matching information from the user management module and saves that matching information in the database 66 for later report generation. The purpose of the metrics module is to not only provide useful data on how the system is operating, but also to create added-value reports that can be sold to businesses that require knowledge of viewer viewing habits. In accordance with one embodiment, the metrics data is sent to an aggregator/sink so that it can be cached and dumped to the database asynchronously. The raw metrics data is saved in the database. That raw metrics data is then processed for inclusion in various reports, such reports on the number of users who watch a given show, the number of users who watch a given show in time shift (e.g., on a DVR), and the number of users who watch a given commercial.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

As used in the claims, the term "a processor system" should be construed broadly to encompass either a single processor or more than one processor. Also, the designation of method steps using alphabetic symbols should not be construed to require that those method steps be performed in alphabetical order.

APPENDIX

The Path Pursuit Problem

Tracking Video Transmission Using Ambiguous Cues

Abstract

A method for efficient video pursuit is presented. Given a large number of video segments, the system must be able to identify in real time what segment a given query video input is taken from and in what time offset. The segment and offset together are referred to as the location. The method is called video pursuit since it must be able to efficiently detect and adapt to pausing, fast forwarding, rewinding, abrupt switching to other segments and switching to unknown segments. Before being able to pursue live video the data base is processed. Visual cues (a handful of pixel values) are taken from frames every constant fraction of a second and put in specialized data structure.[1] The video pursuit is performed by continuously receiving cues from the input video and updating our set of beliefs about its current location. Each cue either agrees or disagrees with our beliefs, and they are adjusted to reflect the new evidence. A video location is assumed to be the correct one if our confidence in this being true is high enough. By tracking only a small set of possible 'suspect' locations we are able to do so efficiently.

[1] Note that this can also be done in real time.

Introduction

This document describes a method for video pursuit but uses abstract mathematical constructs to explain and investigate it. It is the aim of this introduction to give the reader the necessary tools to translate between the two domains. A video signal is comprised of sequential frames. Each can be thought of as a still image. Every frame is a raster of pixels. Each pixel is made out of three intensity values corresponding to the red, green and blue (RGB) make of that pixel's color. In the terminology of this manuscript, a cue is a list of RGB values of a subset of the pixels in a frame and a corresponding time stamp. The number of pixels in a cue is significantly smaller than in a frame, usually between 5 and 15. Being an ordered list of scalar values, the cue values are in fact a vector. This vector is also referred to as a point.

Although these points are in high dimension, usually between 15 and 150, they can be imagined as points in two dimensions. In fact, the illustrations will be given as two dimensional plots. Now, consider the progression of a video and its corresponding cue points. Usually a small change in time produces a small change in pixel values. The pixel point can be viewed as 'moving' a little between frames. Following these tiny movements from frame to frame, the cue follows a path in space like a bead would on a bent wire.

In the language of this analogy, in video pursuit we receive the locations of the bead in space (the cue points) and look for the part of wire (path) the bead is following. This is made significantly harder by two facts. First, the bead does not follow the wire exactly but rather keeps some varying unknown distance from it. Second the wires are all tangled together. These statements are made exact in section 2. The algorithm described below does this in two conceptual steps. When a cue is received, it looks for all points on all the known paths who are sufficiently close to the cue point; these are called suspects. This is done efficiently using the Probabilistic Point Location in Equal Balls algorithm. These suspects are added to a history data structure and the probability of each of them indicating the true location is calculated. This step also includes removing suspect locations who are sufficiently unlikely. This history update process ensures that on the one hand only a small history is kept but on the other hand no probable locations are ever deleted. The generic algorithm is given in Algorithm 1 and illustrated in FIG. 11.

| Algorithm 1 Generic path pursuit algorithm. |
| --- |
| 1: Set of suspects is empty |
| 2: loop |
| 3:     Receive latest cue. |
| 4:     Find path points who are close to it. |
| 5:     Add them to the set of suspects. |
| 6:     Based on the suspects update the location likelihood function. |
| 7:     Remove from suspect set those who do not contribute to the likelihood function. |
| 8:     if A location is significantly likely then |
| 9:         Output the likely location. |
| 10:     end if |
| 11: end loop |

The document begins with describing the Probabilistic Point Location in Equal Balls (PPLEB) algorithm in Section 1. It is used in order to perform line 5 in Algorithm 1 efficiently. The ability to perform this search for suspects quickly is crucial for the applicability of this method. Later, in section 2 we describe one possible statistical model for performing lines 6 and 7. The described model is a natural choice for our setup. We also show how it can be used very efficiently.

1 Probabilistic Point Location in Equal Balls

The following section describes a simple algorithm for performing probabilistic point location in equal balls (PPLEB). In the traditional PLEB (point location in equal balls), one starts with a set of n points $x_i$ in $\mathbb{R}^d$ and a specified ball of radius r. The algorithm is given O(poly(n)) preprocessing time to produce an efficient data structure. Then, given a query point x the algorithm is required to return all points $x_i$ such that $\|x-x_i\| \le r$. The set of points such that $\|x-x_i\| \le r$ geometrically lie within a ball of radius r surrounding the query x (see FIG. 12). We refer to this relation as $x_i$ being close to x or as $x_i$ and x being neighbors.

The problem of PPLEB and the problem of nearest neighbor search are two similar problems that received much attention in the academic community. In fact, these problems where among the first studied in the field of computational geometry. Many different methods cater to the case where the ambient dimension d is small or constant. These partition the space in different ways and recursively search through the parts. These methods include KD-trees [2] cover-trees [1] and others. Although very efficient in low dimension, when the ambient dimension is high, they tend to perform very poorly. This is known as the "curse of dimensionality". Approaches for solving this problem while overcoming the curse of dimensionality include the work of Gionis et al. [3], Lv et al. [5], Kushilevitz et al. [4] and others. The algorithm we use is a simpler and faster version of the algorithm described in [3] and relies on Local Sensitive Hashing.

1.1 Locality Sensitive Hashing

In our scheme of local sensitive hashing, one devises a family of hash functions H such that:

$$\Pr_{h \sim H}(h(x) = h(y) \mid \|x - y\| \le r) \ge 1/\sqrt{n} \quad (1)$$

$$\Pr_{h \sim H}(h(x) = h(y) \mid \|x - y\| > 2r) \le 1/n \quad (2)$$

In words, the probability of x and y being mapped to the same value by h is significantly higher if they are close to each other.

For the sake of clarity, let us first deal with a simplified scenario where all incoming vectors are of the same length r' and r'>$\sqrt{2}$r. The reason for the latter condition will become clear later. First we define a random function u∈U which separates between x and y according the angle between them. Let $\vec{u}$ be a random vector chosen uniformly from the unit sphere $S^{d-1}$ and let $u(x) \equiv \text{sign}(\vec{u} \cdot x)$ (See FIG. 13). It is easy to verify that $\Pr_{u \sim U}(u(x) \ne u(y)) = 0_{x,y}/\pi$. Moreover, for any points x,y,x',y' on a circle such that $\|x'-y'\| \ge 2\|x-y\|$ we have that $0_{x',y'} \ge 2 0_{x,y}$. Defining p we have:

$$\Pr_{u \sim U}(u(x) \ne u(y) \mid \|x - y\| \le r) \equiv p \quad (3)$$

$$\Pr_{u \sim U}(u(x) \ne u(y) \mid \|x - y\| \ge 2r) \ge 2p \quad (4)$$

We set the family of functions H to be a cross product of t independent copies of u, i.e. $h(x) = [u_1(x), \ldots, u_t(x)]$. Intuitively, we would like to have that if h(x)=h(y) then x and y are likely to be close to each other. Let us quantify that. First, compute the expected number of false positive mistakes $n_{fp}$. These are the cases for which h(x)=h(y) but $\|x-y\| > 2r$. We find a value t for which $n_{fp}$ is no more than 1, i.e. we are not expected to be wrong.

$$E[n_{fp}] \le n(1-2p)^t \le 1 \quad (5)$$

$$\rightarrow t \ge \log(1/n)/\log(1-2p) \quad (6)$$

Now, we compute the probability that h(x)=h(y) given that they are neighbors.

$$Pr(h(x) = h(y) \mid \|x - y\| \le r) \ge (1 - p)^{\log(1/n)/\log(1-2p)} \quad (7)$$

$$= (1/n)^{\log(1-p)/\log(1-2p)} \quad (8)$$

$$\ge 1/\sqrt{n}. \quad (9)$$

Note here that we must have that 2p<1 which requires r'>√2r. This might not sound like a very high success probability. Indeed, $1/\sqrt{n}$ is significantly smaller than ½. The next section will describe how we boost this probability up to ½.

1.2 The Point Search Algorithm

Each function h maps every point in space to a bucket. Define the bucket function $B_h: \mathbb{R}^d \to 2^{[n]}$ of a point x with respect to hash function h as $B_h(x) \equiv \{x_i | h(x_i) = h(x)\}$. The data structure we maintain is $m = O(\sqrt{n})$ instances of bucket functions $[B_{h_1}, \ldots, B_{h_m}]$. When one searches for a point x we return $B(x) = \cup_i B_{h_i}(x)$. According to the previous section we have two desired results:

$$Pr(x_i \in B(x) \mid \|x_i - x\| \le r) \ge \frac{1}{2} \quad (10)$$

$$E[|B(x) \cap \{x_i \mid \|x - x_i\| > 2r\}|] \le \sqrt{n}. \quad (11)$$

In other words, while with probability at least ½ we find each neighbor of x, we are not likely to find many non-neighbors.

1.3 Dealing with Different Radii Input Vectors

Figure 14:
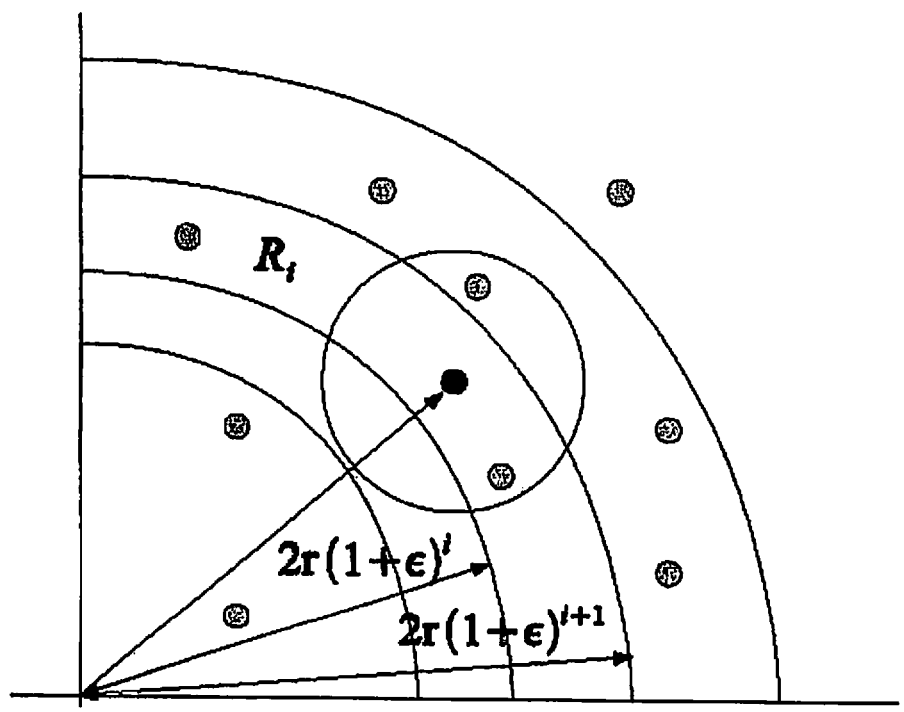

The previous sections only dealt with searching through vectors of the same length, namely r'. We now describe how we can use our construction as a building block to support a search in different radii. As seen in FIG. 14, we divide the space into rings of exponentially growing width. Ring i, denoted by $R_i$, includes all points $x_i$ such that $\|x_i\| \in [2r(1+\epsilon)^i, 2r(1+\epsilon)^{i+1})$. Doing this achieves two ends. First, if $x_i$ and $x_j$ belong to the same ring then $\|x_j\|/(1+\epsilon) \le \|x_i\| \le \|x_j\|(1+\epsilon)$. Second, any search can be performed in at most 1/ε such rings. Moreover, if the maximal length vector in the data set is r' then the total number of rings in the system is $O(\log(r'/r))$.

2 The Path Pursuit Problem

In the path pursuit problem we are given a fixed path in space and the positions of a particle in a sequence of time points. The terms particle, cue, and point will be used interchangeably. The algorithm is required to output the position of the particle on the path. This is made harder by a few factors.

- The particle only follows the path approximately.
- The path can be discontinuous and intersect itself many times.
- Both particle and path positions are given in a sequence of time points (different for each)

It is important to note that this problem can simulate tracking a particle on any number of paths. This is simply done by concatenating the paths into one long path and interpreting the resulting position as the position on the individual paths.

Figure 15:
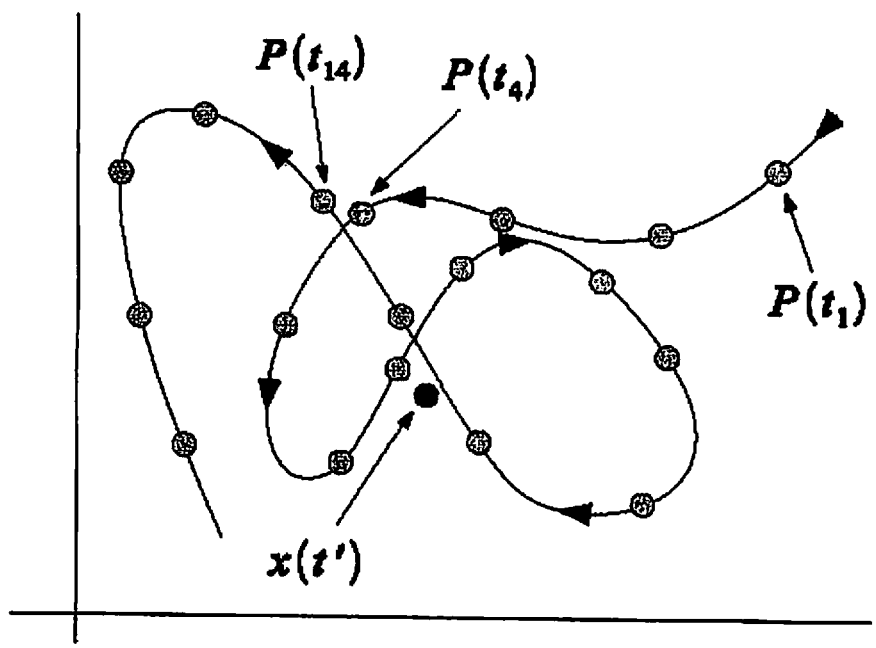

More precisely, let path P be parametric curve P: $\mathbb{R} \to \mathbb{R}^d$. The curve parameter will be referred to as the time. The points on the path that are known to us are given in arbitrary time points $t_i$, i.e. we are given n pairs $(t_i, P(t_i))$. The particle follows the path but its positions are given to us in different time points, as shown in FIG. 15. We are given m pairs $(t'_j, x(t'_j))$, where $x(t'_j)$ is the position of the particle in time $t'_j$.

2.1 Likelihood Estimation

Since the particle does not follow the path exactly and since the path can intersect itself many times it is usually impossible to positively identify the position on the path the particle is actually on. We therefore compute a probability distribution on all possible path locations. If a location probability is significantly probable, the particle position is assumed to be known. The following section describes how this can be done efficiently.

If the particle is following our path, then the time difference between the particle time stamp and the offset of the corresponding points on P should be relatively fixed. In other words, if x(t') is currently in offset t on the path then it should be close to P(t). Also, τ seconds ago it should have been in offset t−τ. Thus x(t'−τ) should be close to P(t−τ).[2] Define the relative offset Δ≡t−t'. Notice that as long as the particle is following the path the relative offset Δ remains unchanged. Namely, x(t') is close to P(t'+Δ).

[2] If the particle is intersecting the path, and x(t') is close to P(t) temporarily, it is unlikely that x(t'−τ) and P(t−τ) will also be close.

The maximum likelihood relative offset is obtained by calculating.

$$\Delta = \underset{\delta}{\arg\max}\ Pr(x(t'_m), x(t'_{m-1}), \ldots, x(t'_1) \mid P, \delta) \quad (12)$$

In words, the most likely relative offset is the one for which the history of the particle is most likely. This equation however cannot be solved without a statistical model. This model must quantify:

- How tightly x follows the path.
- How likely it is that x "jumps" between locations.
- How smooth the path and particle curves are between the measured points.

2.2 Time Discounted Binning

We now describe a simple statistical model for estimating the likelihood function. The model makes the assumption that the particle's deviation away from the path distributes normally with standard deviation αr. It also assumes that at any given point in time, there is some non-zero probability the particle will abruptly switch to another path. This is manifested by an exponential discount with time for past points. Apart for being a reasonable choice for a modeling point of view this model also has the advantage of being efficiently updateable. For some constant time unit τ, set the likelihood function to be proportional to f which is defined as follows:

$$f_m(\lfloor \delta/\tau \rfloor) = \sum_{j=1}^{m} \sum_{i=1}^{n} e^{-\left(\frac{\|x(t'_j)-P(t_i+\delta)\|}{\alpha r}\right)^2} (1-\zeta)^{t'_i-t'_j}. \quad (13)$$

Here α<<1 is a scale coefficient and ζ>0 is the probability that the particle will jump to a random location on the path in a given time unit.

Updating the function f efficiently can be achieved using the following simple observation.

$$f_m(\lfloor \delta/\tau \rfloor) = \sum_{i=1}^{n} e^{-\left(\frac{\|x(t'_m)-P(t_i+\delta)\|}{\alpha r}\right)^2} + f_{m-1}(\lfloor \delta/\tau \rfloor)(1-\zeta)^{t'_m-t'_{m-1}} \quad (14)$$

Moreover, since α<<1, if $\|x(t'_m)-P(t_i)\| \ge r$ we have that:

$$e^{-\left(\frac{\|x(t'_m)-P(t_i)\|}{\alpha r}\right)^2} \approx 0. \quad (15)$$

This is an important property of the likelihood function since we can now perform the sum update only over the neighbors of $x(t'_j)$ and not the entire path. Denote by S the set of $(t_i, P(t_i))$ such that $\|x(t'_m) - P(t_i)\| \leq r$. We have that:

$$f_m(\lfloor \delta/\tau \rfloor) = \sum_{(t_i, P(t_i)) \in S \wedge \lfloor (t'_m - t_i)/\tau \rfloor = \lfloor \delta/\tau \rfloor} e^{-\left(\frac{\|x(t'_m) - P(t_i)\|}{\sigma r}\right)^2} + f_{m-1}(\delta)(1-\zeta)^{t'_m - t'_{m-1}} \quad (16)$$

This is described in Algorithm 2.2. $f$ is used as a sparse vector that receives also negative integer indices. The set S is the set of all neighbors of $x(t_i)$ on the path and can be computed quickly using the PPLEB algorithm. It is easy to verify that if the number of neighbors of $x(t_i)$ is bounded by some constant $n_{near}$ then the number of non-zeros in the vector $f$ is bounded by $n_{near}/\zeta$ which is only a constant factor larger. The final stage of the algorithm is to output a specific value of $\delta$ if $f(\lfloor \delta/\tau \rfloor)$ is above some threshold value.

---

Algorithm 2 Efficient likelihood update.

---

1: $f \leftarrow 0$
2: while $(t_j', x(t_j')) \in$ INPUT do
3:      $f \leftarrow (1-\zeta)^{t_j' t_{j-1}'} f$
4:      $S \leftarrow \{(t_i, P(t_i)) \mid \|x(t_j') - P(t_i)\| \leq r\}$
5:      for $(t_i, P(t_i)) \in S$ do
6:          $\delta \leftarrow t_j' - t_i$
7:          $f(\lfloor \delta/\tau \rfloor) \leftarrow f(\lfloor \delta/\tau \rfloor) + e^{-\left(\frac{\|x(t_i) - P(t_i')\|}{\sigma r}\right)^2}$
8:      end for
9:      Set all f values below threshold $\epsilon$ to zero.
10: end while

---

3 Figures Description

Figure 11:
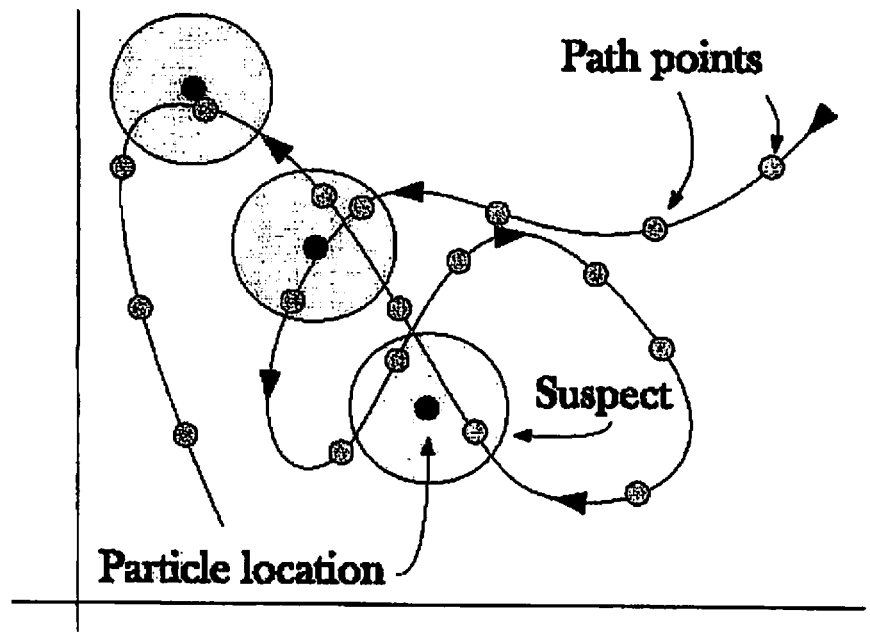
FIGS. 11 through 16 are graphs referenced in the Appendix, in which an algorithm for tracking video transmission using ambiguous cues is disclosed.

FIG. 11 gives three consecutive point locations and the path points around them. Note that neither the bottom point nor middle one alone would have been sufficient to identify the correct part of the path. Together, however, they are. Adding the top point increases our certainty that the particle is indeed of the final (left) curve of the path.

Figure 12:
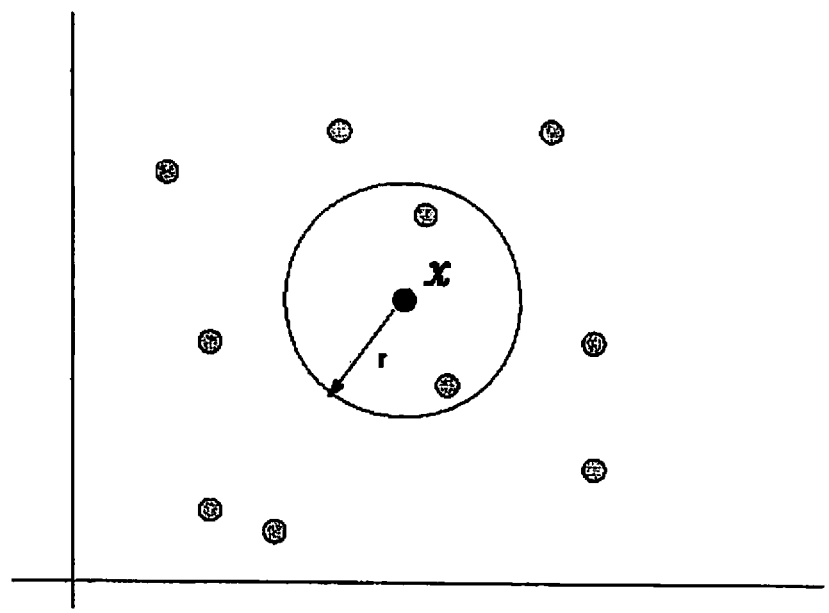

In FIG. 12, given a set of n (grey) points, the algorithm is given a query point (black) and returns the set of points who lie within distance r from it (the points inside the circle). In the traditional setting, the algorithm must return all such points. In the probabilistic setting each such point should be returned only with some constant probability.

Figure 13:
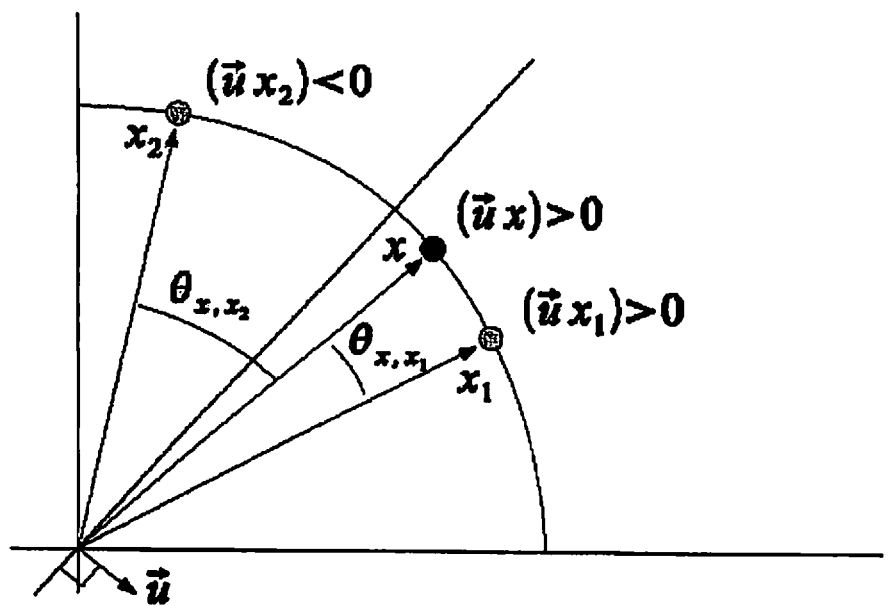

FIG. 13 illustrates the values of $u(x_1)$, $u(x_2)$ and $u(x)$. Intuitively, the function u gives different values to $x_1$ and $x_2$ if the dashed line passes between them and the same value otherwise. Passing the dashed line in a random direction ensures that the probability of this happening is directly proportional to angle between $x_1$ and $x_2$.

FIG. 14 shows that by dividing the space into rings such that ring $R_i$ is between radius $2r(1+\epsilon)^i$ and $2r(1+\epsilon)^{i+1}$, we make sure that any two vectors within a ring are the same length up to $(1+\epsilon)$ factors and that any search is performed in at most $1/\epsilon$ rings.

FIG. 15 shows a self-intersecting paths and a query point (in black). It illustrates that without the history of the particle positions it is impossible to know where it is on the path.

Figure 16:
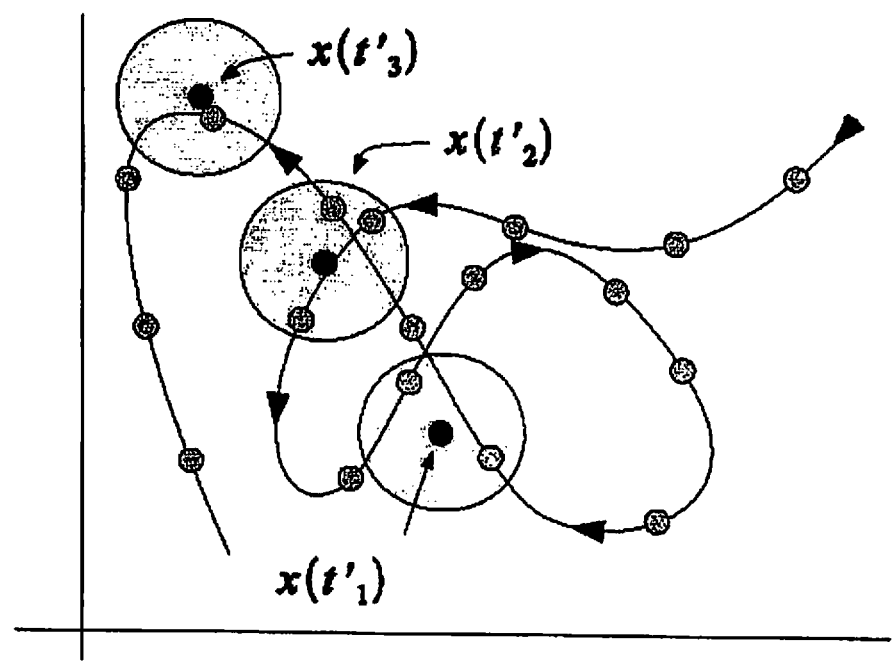

FIG. 16 gives three consecutive point locations and the path points around them. Note that neither $x(t_1)$ nor $x(t_2)$ alone would have been sufficient to identify the correct part of the path. Together however they are. Adding $x(t_3)$ increases our certainty that the particle is indeed of the final (left) curve of the path.

REFERENCES

[1] Alina Beygelzimer, Sham Kakade, and John Langford. Cover trees for nearest neighbor. In *ICML*, pages 97-104, 2006.
[2] Thomas H. Cormen, Charles E. Leiserson, Ronald L. Rivest, and Clifford Stein. *Introduction to Algorithms*. The MIT Press, 2nd revised edition edition, September 2001.
[3] Aristides Gionis, Piotr Indyk, and Rajeev Motwani. Similarity search in high dimensions via hashing. In *VLDB*, pages 518-529, 1999.
[4] Eyal Kushilevitz, Rafail Ostrovsky, and Yuval Rabani. Efficient search for approximate nearest, neighbor in high dimensional spaces. *SIAM J. Comput.*, 30(2):457-474, 2000.
[5] Qin Lv, William Josephson, Zhe Wang, Moses Charikar, and Kai Li. Multi-probe lsh: Efficient indexing for high-dimensional similarity search. In *VLDB*, pages 950-961, 2007.

The invention claimed is:

1. A method, performed by a centrally located computer system, for automatically providing contextually targeted content to a remotely located television system comprising a video screen, while a video segment is being displayed on the video screen, said method comprising the following steps:

(a) storing in a database a respective reference cue data set for each of a multiplicity of reference video segments, each reference cue data set comprising: (i) a respective sample set of reference data points derived from television signals for respective portions of a respective reference video segment having respective offset times relative to a starting point of said respective reference video segment; and (ii) a respective set of associated location data, each set of associated location data comprising segment identity data identifying said respective reference video segment and offset time data comprising a respective offset time of a respective portion relative to a starting point of said respective reference video segment;

(b) receiving cue points and respective time stamps from the television system during display of a video segment on the video screen, each cue point comprising a respective sample set of data points derived from television signals for a respective portion of said video segment being displayed on the video screen;

(c) for each received cue point, searching the database for sample sets of reference data points which are a sufficiently close match to the received cue point;

(d) storing suspect location data in a history data structure, said suspect location data comprising segment identity data and time offset data associated with the sufficiently close sample sets of reference data points found in step (c);

(e) calculating a respective certainty probability for each of said suspect locations, each certainty probability representing a degree of certainty that a respective portion of a reference video segment corresponding to a respective suspect location is the same as the portion of said video segment that was displayed on the video screen;

(f) summing said certainty probabilities;

(g) determining whether the sum of said certainty probabilities exceeds a preset probability threshold;

(h) in response to a determination in step (g) that the sum of said certainty probabilities exceeds said preset probability threshold, retrieving from said database content associated with the portion of the reference video segment corresponding to said suspect location having said certainty probability in excess of said preset probability threshold; and (i) sending said retrieved content to the television system while said video segment is still being displayed on the video screen.

2. The method as recited in claim 1, wherein step (a) comprises indexing said data sets for said reference video segments using locality-sensitive hashing, and step (c) comprises locality-sensitive hashing of each received cue point to determine a sector of said database to search in.

3. The method as recited in claim 1, further comprising reducing said history data structure using probabilistic point location in equal balls to locate possible data matches.

4. The method as recited in claim 3, wherein said history data structure is reduced using probabilistic point location in equal balls to locate possible data matches using variable radiuses.

5. The method as recited in claim 1, wherein said history data structure comprises respective bins associated with respective reference video segments corresponding to said suspect location data.

6. The method as recited in claim 1, wherein step (e) comprises exponential discounting with time for past cue points.

7. The method as recited in claim 1, further comprising removing suspect locations which are sufficiently unlikely from said history data structure.

8. A system for providing contextually targeted content to a television system comprising a video screen while a video segment is being displayed on the video screen, said system comprising a database and a processing system, wherein said database contains a respective reference cue data set for each of a multiplicity of reference video segments, each reference cue data set comprising: (i) a respective sample set of reference data points derived from television signals for respective portions of a respective reference video segment having respective offset times relative to a starting point of said respective reference video segment; and (ii) a respective set of associated location data, each set of associated location data comprising segment identity data identifying said respective reference video segment and offset time data comprising a respective offset time of a respective portion relative to a starting point of said respective reference video segment, and wherein said processing system is programmed to perform the following operations while the video segment is being displayed on the video screen:

(a) receiving cue points and respective time stamps from the television system during display of a video segment on the video screen, each cue point comprising a respective sample set of data points derived from television signals for a respective portion of said video segment being displayed on the video screen;

(b) for each received cue point, searching the database for sample sets of reference data points which are a sufficiently close match to the received cue point;

(c) storing suspect location data in a history data structure, said suspect location data comprising segment identity data and time offset data associated with the sufficiently close sample sets of reference data points found in step (b);

(d) calculating a respective certainty probability for each of said suspect locations, each certainty probability representing a degree of certainty that a respective portion of a reference video segment corresponding to a respective suspect location is the same as the portion of said video segment that was displayed on the video screen;

(e) summing said certainty probabilities;

(f) determining whether the sum of said certainty probabilities exceeds a preset probability threshold;

(g) in response to a determination in step (f) that the sum of said certainty probabilities exceeds said preset probability threshold, retrieving from said database content associated with the portion of the reference video segment corresponding to said suspect location having said certainty probability in excess of said preset probability threshold; and (h) sending said retrieved content to the television system while said video segment is still being displayed on the video screen.

9. The system as recited in claim 8, wherein said reference cue data sets are stored in said database in accordance with a locality-sensitive hashing algorithm, and operation (c) comprises locality-sensitive hashing of each received cue point in accordance with said locality-sensitive hashing algorithm to determine a sector of said database to search in.

10. The system as recited in claim 8, wherein said processing system is further programmed to reduce said history data structure using probabilistic point location in equal balls to locate possible data matches.

11. The system as recited in claim 10, wherein said history data structure is reduced using probabilistic point location in equal balls to locate possible data matches using variable radiuses.

12. The system as recited in claim 8, wherein said history data structure comprises respective bins associated with respective reference video segments corresponding to said suspect location data.

13. The system as recited in claim 8, wherein operation (d) comprises exponential discounting with time for past cue points.

14. The system as recited in claim 8, wherein said processing system is further programmed to remove suspect locations which are sufficiently unlikely from said history data structure.

15. A method, performed by a centrally located computer system, for automatically providing contextually targeted content to a remotely located television system comprising a video screen, while a video segment is being displayed on the video screen, said method comprising the following steps:

(a) storing in a database a respective reference cue data set for each of a multiplicity of reference video segments, each reference cue data set comprising: (i) a respective sample set of reference data points derived from television signals for respective portions of a respective reference video segment having respective offset times relative to a starting point of said respective reference video segment; and (ii) a respective set of associated location data, each set of associated location data comprising segment identity data identifying said respective reference video segment and offset time data comprising a respective offset time of a respective portion relative to a starting point of said respective reference video segment;

(b) receiving cue points and respective time stamps from the television system during display of a video segment on the video screen, each cue point comprising a respective sample set of data points derived from television signals for a respective portion of said video segment being displayed on the video screen;

(c) for each received cue point, searching the database for sample sets of reference data points which are a sufficiently close match to the received cue point;

(d) storing suspect location data in a history data structure, said suspect location data comprising segment identity data and time offset data associated with the sufficiently close sample sets of reference data points found in step (c);

(e) calculating a respective certainty probability for each of said suspect locations, each certainty probability representing a degree of certainty that a respective portion of a reference video segment corresponding to a respective suspect location is the same as the portion of said video segment that was displayed on the video screen;

(f) summing said certainty probabilities;

(g) determining whether the sum of said certainty probabilities exceeds a preset probability threshold; and (h) in response to a determination in step (g) that the sum of said certainty probabilities exceeds said preset probability threshold, retrieving from said database segment identity data identifying the portion of the reference video segment corresponding to the suspect location having said certainty probability in excess of said preset probability threshold.

16. The method as recited in claim 15, wherein step (a) comprises indexing said data sets for said reference video segments using locality-sensitive hashing, and step (c) comprises locality-sensitive hashing of each received cue point to determine a sector of said database to search in.

17. The method as recited in claim 15, further comprising reducing said history data structure using probabilistic point location in equal balls to locate possible data matches.

18. The method as recited in claim 17, wherein said history data structure is reduced using probabilistic point location in equal balls to locate possible data matches using variable radiuses.

19. The method as recited in claim 15, wherein said history data structure comprises respective bins associated with respective reference video segments corresponding to said suspect location data.

20. The method as recited in claim 15, wherein step (e) comprises exponential discounting with time for past cue points.

21. The method as recited in claim 15, further comprising removing suspect locations which are sufficiently unlikely from said history data structure.

22. A system for providing contextually targeted content to a television system comprising a video screen while a video segment is being displayed on the video screen, said system comprising a database and a processing system, wherein said database contains a respective reference cue data set for each of a multiplicity of reference video segments stored, each reference cue data set comprising: (i) a respective sample set of reference data points derived from television signals for respective portions of a respective reference video segment having respective offset times relative to a starting point of said respective reference video segment; and (ii) a respective set of associated location data, each set of associated location data comprising segment identity data identifying said respective reference video segment and offset time data comprising a respective offset time of a respective portion relative to a starting point of said respective reference video segment, and wherein said processing system is programmed to perform the following operations while the video segment is being displayed on the video screen:

(a) receiving cue points and respective time stamps from the television system during display of a video segment on the video screen, each cue point comprising a respective sample set of data points derived from television signals for a respective portion of said video segment being displayed on the video screen;

(b) for each received cue point, searching the database for sample sets of reference data points which are a sufficiently close match to the received cue point;

(c) storing suspect location data in a history data structure, said suspect location data comprising segment identity data and time offset data associated with the sufficiently close sample sets of reference data points found in step (b);

(d) calculating a respective certainty probability for each of said suspect locations, each certainty probability representing a degree of certainty that a respective portion of a reference video segment corresponding to a respective suspect location is the same as the portion of said video segment that was displayed on the video screen;

(e) summing said certainty probabilities;

(f) determining whether the sum of said certainty probabilities exceeds a preset probability threshold; and (g) in response to a determination in step (g) that the sum of said certainty probabilities exceeds said preset probability threshold, retrieving from said database segment identity data identifying the portion of the reference video segment corresponding to the suspect location having said certainty probability in excess of said preset probability threshold.

23. The system as recited in claim 22, wherein said reference cue data sets are stored in said database in accordance with a locality-sensitive hashing algorithm, and operation (c) comprises locality-sensitive hashing of each received cue point in accordance with said locality-sensitive hashing algorithm to determine a sector of said database to search in.

24. The system as recited in claim 22, wherein said processing system is further programmed to reduce said history data structure using probabilistic point location in equal balls to locate possible data matches.

25. The system as recited in claim 24, wherein said history data structure is reduced using probabilistic point location in equal balls to locate possible data matches using variable radiuses.

26. The system as recited in claim 22, wherein said history data structure comprises respective bins associated with respective reference video segments corresponding to said suspect location data.

27. The system as recited in claim 22, wherein operation (d) comprises exponential discounting with time for past cue points.

28. The system as recited in claim 22, wherein said processing system is further programmed to remove suspect locations which are sufficiently unlikely from said history data structure.

29. A web-based server system for automatically providing contextually targeted video or audio content for display on a video screen of a client television system, comprising:

one or more databases for storing a reference cue data set and associated content for each of a multiplicity of reference video segments;

a reference cue data generation computer system programmed to act on a multiplicity of television program sources for generating a multiplicity of reference cue data sets, each reference cue data set comprising: (i) a sample set of reference data points derived from a respective reference video segment, (ii) a time code derived from the respective broadcast time of said respective video segment, and (iii) a respective set of associated metadata, each set of associated metadata comprising segment identity data identifying said respective reference video segment;

a remotely located client television system comprising means for generating cue data sets during display of a video segment on said video screen of said client television system, each cue data set comprising a respective sample set of data points derived from television signals for a respective portion of said video segment being displayed on said video screen in a manner consistent with the reference cue data generation computer system and associated time codes;

a video matching computer system programmed to match cue data sets from unknown video segments from said client television system against said reference cue data sets to search the database for reference cue data sets which are a sufficiently close match to the received cue data sets; and wherein said video matching computer system is programmed to determine a closest match by executing the following operations:

a content retrieval computer system programmed to retrieve content associated with the reference cue data sets which are a closest match to the received cue data sets, and send said retrieved content to said client television system while said video segment is still being displayed on said video screen of said client television system;

storing suspect location data in a history data structure, said suspect location data comprising segment identity data and time offset data respectively associated with reference cue data sets which are a sufficiently close match to the received cue data sets;

calculating a respective certainty probability for each suspect location identified by said suspect location data, each certainty probability representing a degree of certainty that a respective portion of a reference video segment identified by a respective suspect location is the same as the portion of said video segment that was displayed on said screen of said client television system;

summing said certainty probabilities; and determining whether the sum of said certainty probabilities exceeds a preset probability threshold.

* * * * *